(12) United States Patent
Nonoyama et al.

(10) Patent No.: US 7,800,645 B2
(45) Date of Patent: Sep. 21, 2010

(54) IMAGE DISPLAY METHOD AND IMAGE DISPLAY APPARATUS

(75) Inventors: Yasumasa Nonoyama, Tokyo (JP); Yoshiko Maeda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1367 days.

(21) Appl. No.: 10/550,550

(22) PCT Filed: Jun. 20, 2003

(86) PCT No.: PCT/JP03/07861

§ 371 (c)(1), (2), (4) Date: Sep. 26, 2005

(87) PCT Pub. No.: WO2004/113836

PCT Pub. Date: Dec. 29, 2004

(65) Prior Publication Data

US 2006/0215027 A1 Sep. 28, 2006

(51) Int. Cl.
*H04N 7/18* (2006.01)

(52) U.S. Cl. .................. 348/144; 348/143; 348/140; 396/12; 701/23; 701/223

(58) Field of Classification Search ............. 348/144, 348/143, 140; 701/23, 223; 396/12
See application file for complete search history.

(56) References Cited

U.S. PATENT DOCUMENTS

| | | | | |
|---|---|---|---|---|
| 4,661,811 A | * | 4/1987 | Gray et al. | 345/636 |
| 4,825,232 A | * | 4/1989 | Howdle | 396/12 |
| 5,200,902 A | * | 4/1993 | Pilley | 701/120 |
| 5,483,865 A | * | 1/1996 | Brunand | 89/41.21 |
| 5,589,901 A | * | 12/1996 | Means | 396/12 |
| 5,818,951 A | * | 10/1998 | Schivley | 382/100 |
| 6,529,615 B2 | * | 3/2003 | Hendrickson et al. | 382/110 |
| 6,535,816 B1 | * | 3/2003 | Smith | 701/213 |
| 6,584,382 B2 | * | 6/2003 | Karem | 701/3 |
| 6,653,990 B1 | * | 11/2003 | Lestruhaut | 345/8 |
| 6,694,064 B1 | * | 2/2004 | Benkelman | 382/284 |
| 6,738,859 B2 | * | 5/2004 | Liebchen | 716/19 |
| 6,766,226 B2 | * | 7/2004 | Andersen | 701/3 |
| 6,822,742 B1 | * | 11/2004 | Kalayeh et al. | 356/437 |
| 6,925,382 B2 | * | 8/2005 | Lahn | 701/223 |
| 7,186,978 B2 | * | 3/2007 | Bevan et al. | 250/330 |
| 7,236,613 B2 | * | 6/2007 | Murata | 382/103 |
| 7,358,498 B2 | * | 4/2008 | Geng et al. | 250/347 |

(Continued)

FOREIGN PATENT DOCUMENTS

JP 08-285590 A 11/1996

(Continued)

*Primary Examiner*—Thomas G Black
*Assistant Examiner*—Wae Louie
(74) *Attorney, Agent, or Firm*—Sughrue Mion, PLLC

(57) ABSTRACT

An image display method in which a position of a shot image of the ground surface having been taken from the air is specified three-dimensionally, a photographic area on the ground surface having been shot is obtained by computation, and a shot image is transformed in conformity with the photographic area thereof and thereafter displayed being superposed on a map of geographic information system, and in which landmarks are extracted from a map of a geographic information system and a shot image respectively, and the corresponding landmarks are compared, whereby a parameter for use in computing a photographic area having been shot is compensated.

18 Claims, 26 Drawing Sheets

104: TRANSMISSION MEANS
105: PHOTOGRAPHIC MEANS
106: CAMERA POSTURE MEASUREMENT MEANS
107: AIRFRAME POSTURE MEASUREMENT MEANS
108: AIRFRAME POSITION MEASUREMENT MEANS
109: MULTIPLEX MODULATOR
110: SIGNAL CONVERSION MEANS
111: TRACKING MEANS
113: TEMPORAL STORAGE MEANS

201: RECEIVING MEANS
202: TRACKING MEANS
203: SIGNAL CONVERSION MEANS
204: MULTIPLEX DEMODULATOR
205: SIGNAL PROCESSING MEANS
206: MAP PROCESSING MEANS
207: MOVING IMAGE DATA
208: STILL IMAGE DATA
209: TWO-DIMENSIONAL MAP DATA
210: TOPOGRAPHIC DATA
211: MONITOR DISPLAY MEANS

U.S. PATENT DOCUMENTS

| | | | |
|---|---|---|---|
| 7,411,196 B2 * | 8/2008 | Kalayeh | 250/342 |
| 2001/0036295 A1 * | 11/2001 | Hendrickson et al. | 382/110 |
| 2002/0060734 A1 | 5/2002 | Hino et al. | |
| 2002/0163582 A1 * | 11/2002 | Gruber et al. | 348/218.1 |
| 2003/0218675 A1 * | 11/2003 | Nonoyama | 348/144 |
| 2003/0220734 A1 * | 11/2003 | Harrison et al. | 701/208 |
| 2005/0278087 A1 * | 12/2005 | Lahn | 701/23 |
| 2006/0075356 A1 * | 4/2006 | Faulkner et al. | 715/782 |
| 2006/0215027 A1 * | 9/2006 | Nonoyama et al. | 348/144 |
| 2007/0285663 A1 * | 12/2007 | Hewitt et al. | 356/399 |
| 2008/0074494 A1 * | 3/2008 | Nemethy et al. | 348/143 |

FOREIGN PATENT DOCUMENTS

| | | |
|---|---|---|
| JP | 10042282 A * | 2/1998 |
| JP | 10-210456 A | 8/1998 |
| JP | 11-331831 A | 11/1999 |
| JP | 2002-369189 A | 12/2002 |
| JP | 2003-5628 A | 1/2003 |

* cited by examiner

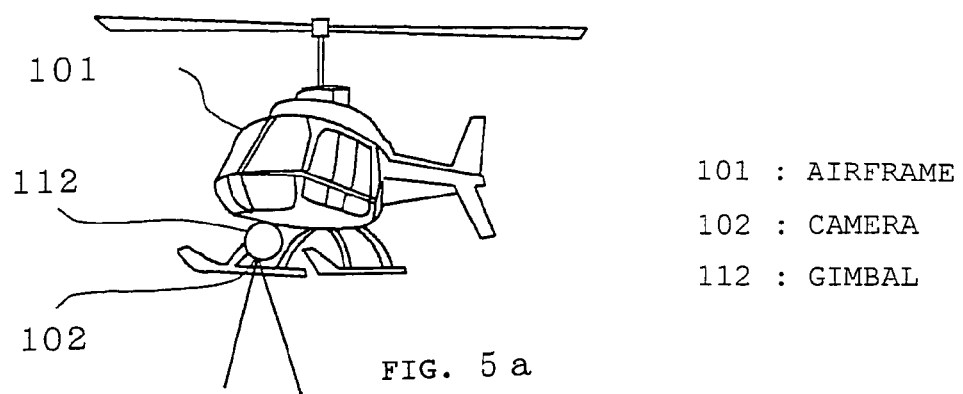
101 : AIRFRAME
102 : CAMERA
112 : GIMBAL
FIG. 5 a
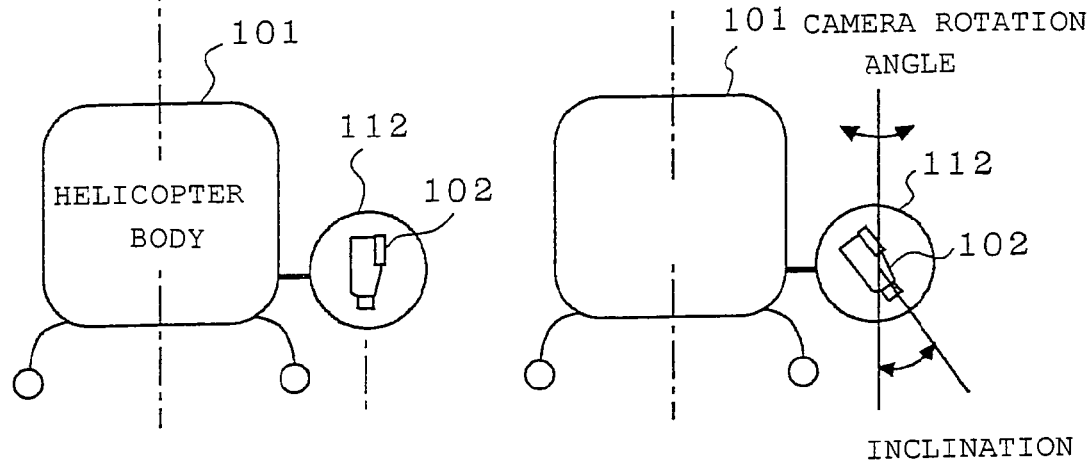
FIG. 5 b
FIG. 5 c

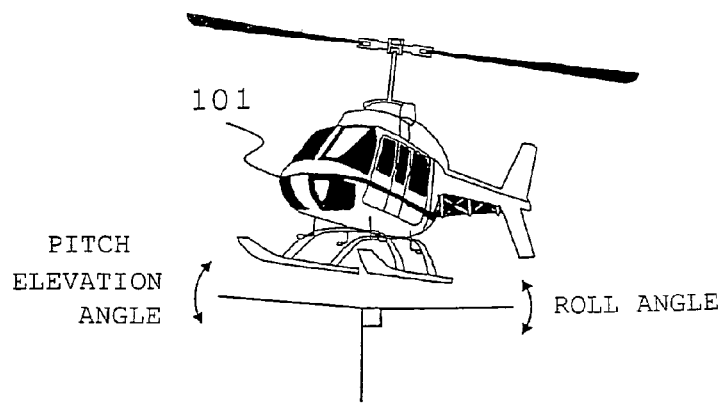
FIG. 17a
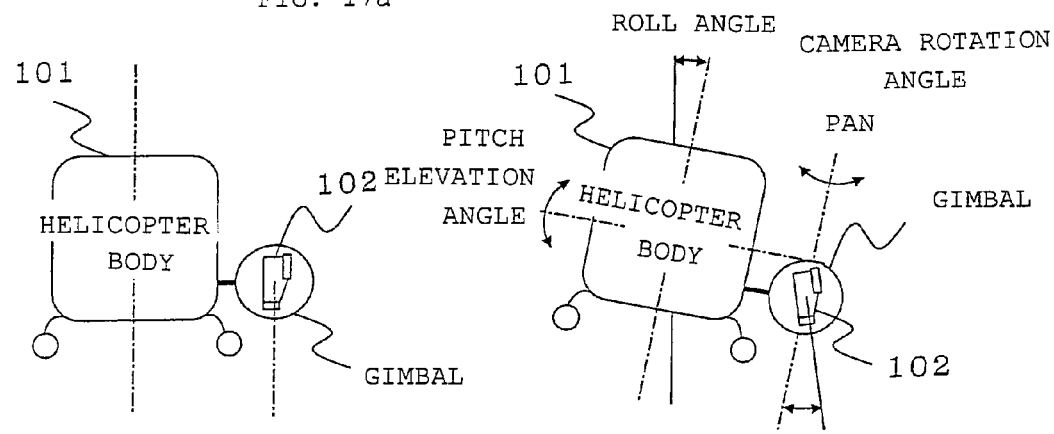
FIG. 17b
FIG. 17c

● LANDMARK ON MAP

▲ LANDMARK ON IMAGE

IMAGE DISPLAY METHOD AND IMAGE DISPLAY APPARATUS

TECHNICAL FIELD

The present invention relates to an image display method characterized in that an image, which is transmitted from a photographic device mounted onto, for example, a helicopter, is displayed being superposed on a map of a geographic information system, thereby enabling to determine situations on the ground easily as well as with sufficient precision in the case where natural disaster such as earthquake or fire, or human disaster such as explosion or serious accident occur; and the invention also relates to an image display apparatus using such an image display method.

BACKGROUND ART

It is a very important technology to specify a position of an object being located on the ground and having been shot from the air on a map, in view of facilitating judgment of situations on the ground in the case of occurrence of any natural disaster such as earthquake, fire or any man-made disaster such as explosion, serious accident. In the conventional positional specification method and device, as shown, for example, in the Japanese Patent No. 2695393, a shooting position in the air is specified three-dimensionally, a direction of a target with respect to a shooting position is measured, a ground surface where the target resides is obtained based on a three-dimensional topographic data including altitude information as to undulation of the ground surface which data has been preliminarily prepared, and a position of the target on the ground surface having been shot from the air is specified as a point of intersection of the ground surface with a straight line extending from the shooting position toward the target.

In the conventional positional specification method and device, to specify the position of a target on the ground surface, a three-dimensional topographic data including altitude information as to undulation of the ground surface which data has been preliminarily prepared is needed as a prerequisite. Further, measurement error that occurs at the time of specifying three-dimensionally a shooting position in the air and at the time of measuring the direction of a target with respect to the shooing position cannot be compensated, thus making it hard to specify a position with accuracy. Furthermore, since the positional specification is executed with respect to one point of target, a problem exists in that situations on the ground surface cannot be understood area-wide.

DISCLOSURE OF INVENTION

The present invention was made to solve the above-discussed problems, and has an object of providing an image display method in which shot images are displayed being superposed on a map of a geographic information system, thereby enabling to understand area-wide situations on the ground surface having been shot; as well as in which a display position on the map of an image is compensated by comparison between the shot image and the map to carry out the superposed display with high precision, thereby enabling to understand situations of the ground surface having been shot more easily and rapidly; and the invention has another object of providing an image display apparatus using such an image display method.

To accomplish the foregoing objects, in an image display method and an image display apparatus using such an image display method according to the invention, a shot image of the ground surface having been taken with photographic equipment that is mounted on an airframe in the air is image-processed and displayed, a shooting position in the air is specified three-dimensionally, a photographic area on the ground surface having been shot is obtained by computation, and a shot image is transformed in conformity with the mentioned photographic area and thereafter displayed being superposed on a map of a geographic information system.

In a further image display method and an image display apparatus, a shot image of the ground surface having been taken with photographic equipment that is mounted on an airframe in the air is image-processed and displayed, a shooting position in the air is specified three-dimensionally, a photographic area of the ground surface having been shot is obtained by computation, and a shot image is transformed in conformity with the mentioned photographic area and thereafter displayed being superposed on a map of a geographic information system; and in which landmarks are extracted from a map of the geographic information system and a shot image respectively and the corresponding landmarks are compared, whereby a parameter for use in computing a photographic area of the ground surface having been shot is compensated, and a shot image is displayed being superposed with high precision on a map of the geographic information system.

According to this invention, it becomes easy to ascertain conformity between image information and a map, thereby enabling to identify a target point of land easily.

BRIEF DESCRIPTION OF DRAWINGS

FIG. 5 are views explaining a third embodiment of the invention.

FIG. 17 are views explaining angle parameters for use in computing a photographic frame in map processing means according to the ninth embodiment.

BEST MODE FOR CARRYING OUT THE INVENTION

Embodiment 1

First, the present invention is summarized. The invention is to display a shot image of the ground having been shot from the air, being superposed on a map of a geographic information system (GIS=Geographic Information System, system of displaying a map on the computer screen), thereby making it easy to acknowledge conformity between an image information and a map, and making it easy to determine a target point of land. In this regard, in the case of taking a shot of the ground from the air with a camera, an image thereof is taken only in a certain rectangular shape at all times regardless of direction of the camera. Therefore, it is difficult to superpose (paste) as it is an image having been shot on a map that is obtained with the geographic information system. Thus, according to this invention, a photographic area (=photographic frame) of the ground surface to be shot, the photographic area complicatedly varying from a rectangle to a shape close to trapezoid or rhombus depending on, e.g., posture of the camera with respect to the ground, is obtained by computation using camera information and posture information of an airframe at the time of shooting an image. Then the shot image is transformed in conformity with the image frame, pasted onto the map, and displayed.

Figure 1:
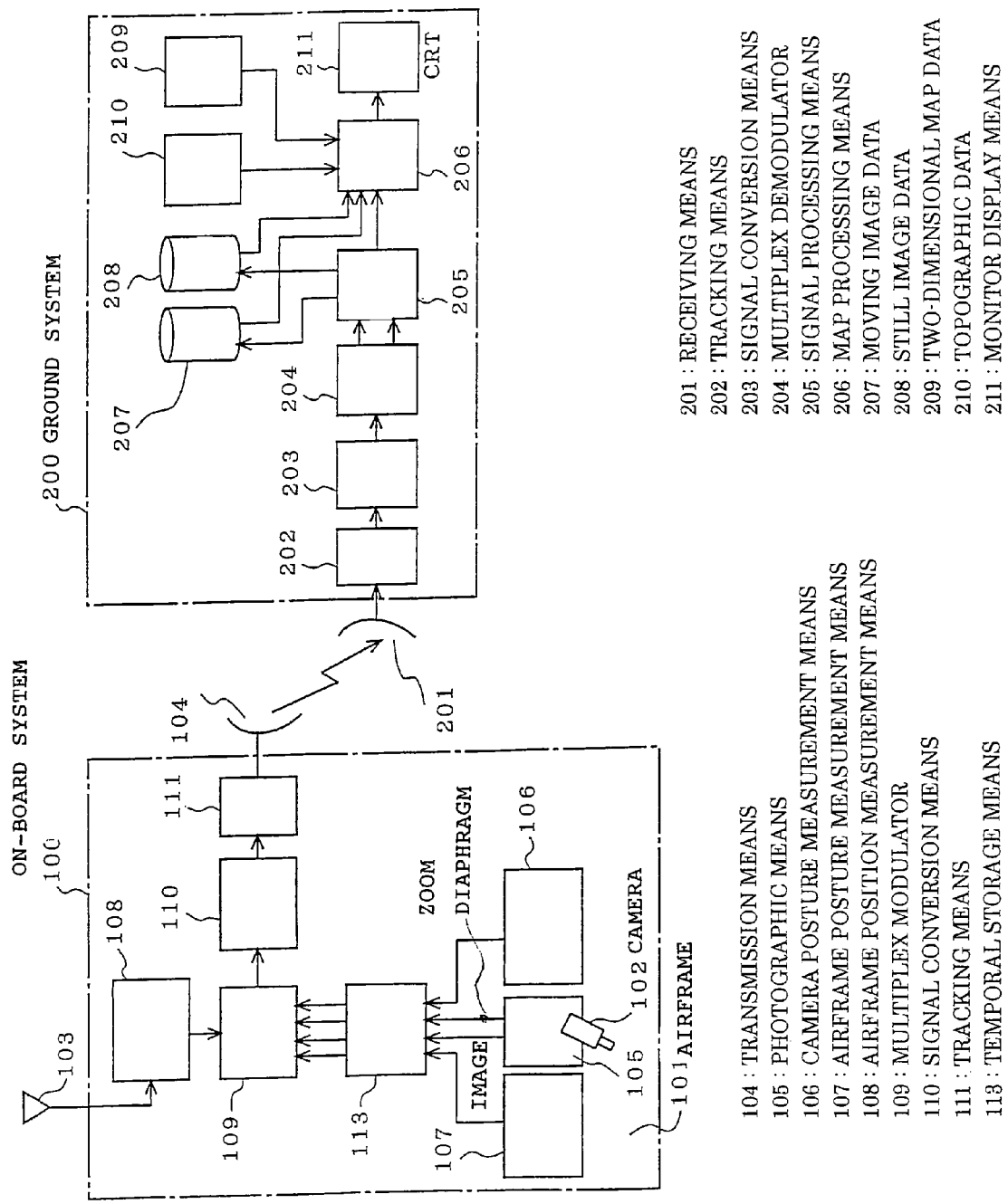
FIG. 1 is a block diagram showing an image display apparatus for carrying out an image display method according to a first preferred embodiment of the present invention.
Figure 2:
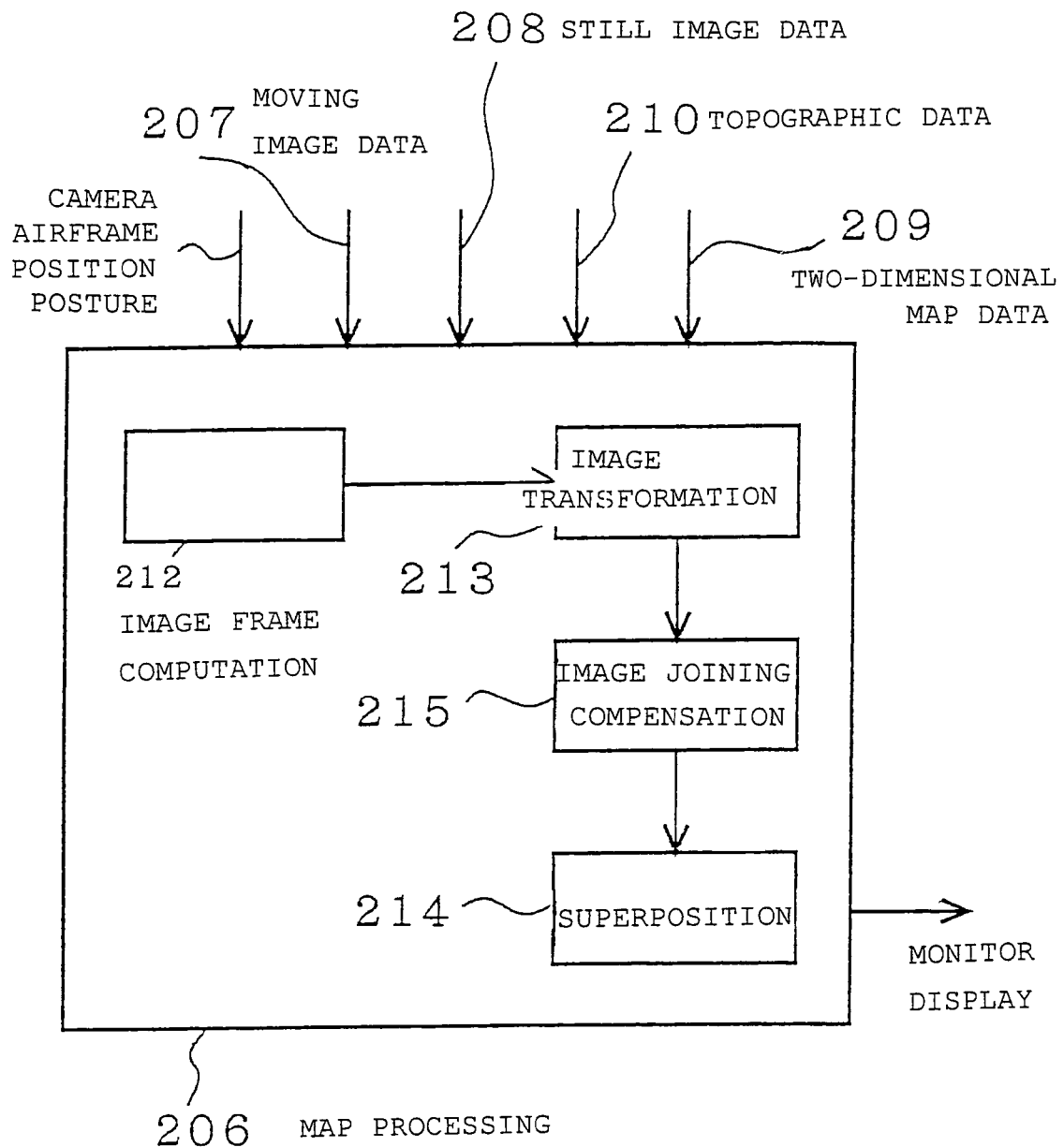
FIG. 2 is an explanatory diagram of functions of map processing means in the first embodiment.

Hereinafter, an image processing method and an image display apparatus according to a first preferred embodiment of the invention is described with reference to the drawings. FIG. 1 is a block diagram explaining an image display apparatus of carrying out the method of the invention. FIG. 2 is a diagram explaining functions of map processing means. The method and apparatus of the invention are implemented with an on-board system 100 formed of a flight vehicle (=airframe) such as helicopter on which, e.g., photographic equipment (=camera) is mounted, and a ground system 200 located on the ground that receives signals from the on-board system 100 and processes them.

The on-board system 100 is formed of on-board devices including photographic means for taking a shot of the ground from the air, airframe position measurement means 108 or airframe posture measurement means 107 acting as information collection section that obtains information for specifying three-dimensionally a shooting position of photographic means, and transmission means for transmitting a shot image having been taken by the mentioned photographic means and information obtained by the mentioned information collection section.

More specifically, on the on-board system 100, a camera 102 acting as photographic means 105 that takes pictures of the ground from the air is mounted. The airframe 101 is provided with airframe position measurement means 108 that obtains current positional information with an antenna 103, being a GPS signal receiving section, and detects an airframe position, and a gyro. The airframe 101 is further provided with airframe posture measurement means 107 that performs airframe posture detection of detecting a posture, that is, an elevation angle (=pitch) and a roll angle of the airframe 101.

The photographic means 105 including the camera 102 takes a shot of the ground and outputs image signals thereof, and also outputs camera information such as diaphragm or zoom of the camera as well. The camera 102 is attached to a gimbal, and this gimbal includes camera posture measurement means 106 detecting a rotation angle (=pan) and inclination (=tilt) of the camera, and outputs values thereof.

An output signal from the mentioned airframe position measurement means 108, an output signal from the mentioned airframe posture measurement means 107, an image signal and a camera information signal of the mentioned camera shooting means 105, an output signal from the mentioned camera posture measurement means 106 are multiplexed and modulated by multiplex modulator 109. These signals are converted to digital signals by signal conversion means 110, and transmitted to the ground system 200 from transmission means 104 having tracking means 111.

The ground system 200 is mainly constituted of: an input section that inputs a shot image of the ground surface, which photographic means takes from the air, and information for three-dimensionally specifying a shooting position of the above-mentioned photographic means; a signal processing section that performs signal processing with respect to information having been inputted; a geographic information system that displays a map on the screen; and a map processing section that processes the image as well as the information having been processed at the signal processing section, and displays the resultant picture on the monitor.

More specifically, signals from the on-board system 100 are received with receiving means 201 including tracking means 202, and signal-converted by signal conversion means 203. These signals are fetched out as image signals and the other information signals such as airframe position, airframe posture, camera posture or camera information with multiplex demodulator 204. These fetched-out signals are signal-processed with signal processing means 205, and the image signals are used in map processing with map processing means 206 in the next step as a moving image data 207 and a still image data 208. Other information signals including a two-dimensional map data 209 and a topographic data 210 of the geographic information system are also used in map processing with map processing means 206. Numeral 211 designates monitor display means.

FIG. 2 is a schematic diagram showing map processing means of the image display system according to this first embodiment. The map processing means 206, as shown in FIG. 2, executes the processing with a moving image data 207 and still image data 208, being image signals, information signals of airframe position, airframe posture and camera posture, and a two-dimensional map data 209 and a three-dimensional topographic data 210 of the geographic information system. This map processing means 206 is mainly constituted of a photographic area computing section (image frame computing 212) that obtains a photographic area on the map of the geographic information system corresponding to a photographic area of a shot image, which the photographic means has taken; an image transformation section (image transformation 213) that transforms the mentioned shot image in conformity with a photographic area having been obtained by the image frame computing 212; and a monitor (e.g., super impose 214) that displays the mentioned transformed shot image super imposed on the mentioned photographic area of the mentioned map.

At the map processing 206, first, image frame computation is executed in image frame 212 in which a shooting position in the air is specified three-dimensionally with information signals regarding an airframe position, and a photographic area (=photographic frame) of the ground surface having been shot is obtained by computation based on posture of the camera and airframe with respect to the ground surface. Image transformation 213 is performed in conformity with this image frame. This image transformation is to transform the image so that an image becomes, e.g., a shape close to trapezoid, or rhombus in which shape the image conforms to the map. Then, the transformed image is superposed (pasted) in superposition step 214 onto a map of the geographic information system. Thereafter, this resultant picture is displayed with monitor display means 211 such as CRT.

Figure 3:
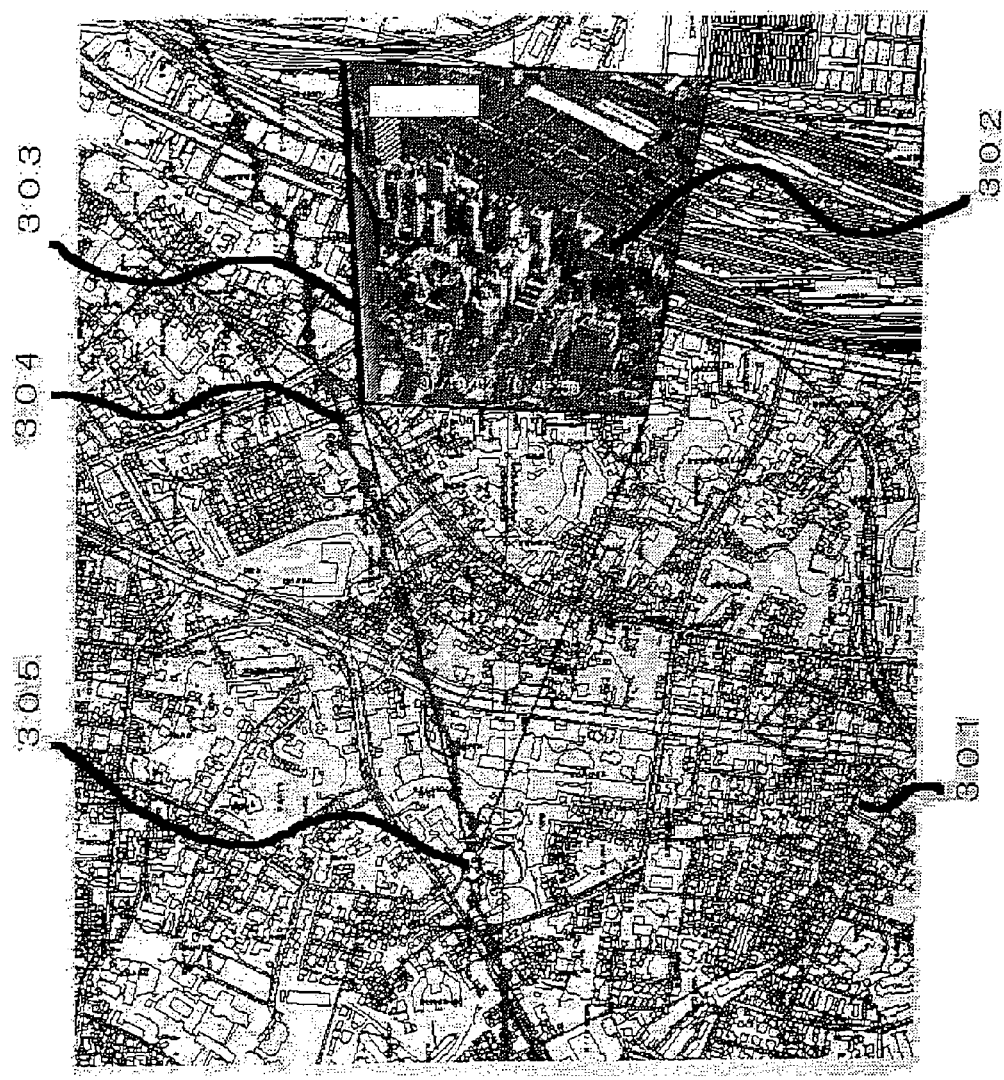
FIG. 3 is a photograph showing a display screen according to the first embodiment.

FIG. 3 is a photograph in which a shot image 302 is superposed on a map 301 of the geographic information system with a photographic frame 303 corresponding to the map. Numeral 304 designates a flight path of the airframe, and numeral 305 designates an airframe position (camera position). The map processing including the above-described transformation processing with the map processing means 206 causes an image to be in coincidence with the map substantially at all points, as shown in FIG. 3, and makes it easy to ascertain conformity between image information and map, thereby enabling to determine a target point easily.

Further, as shown in FIG. 3, an image of the image frame having been shot with the camera, can be displayed being superposed on the map, as well as it can be done easily to erase the shot image 302 and display only the image frame 303. Herein the shot image 302 is superposed on the two-dimensional map. Accordingly, for example, a place of the disaster occurrence (e.g., building on fire) is visually confirmed with the shot image 302, and the position thereof is checked (clicked) on the shot image 302. Thereafter, the image 302 is erased, and the two-dimensional map under the shot image 302 is displayed leaving only the image frame 303 displayed, thus enabling to rapidly recognize a place on the map of the position having been checked on the shot image. Further, supposing that displayed images on a monitor are arranged to display in a definite direction regardless of a direction of the camera, the determination of a target point becomes still easier.

Embodiment 2

According to this second embodiment, a current position of the airframe 101 is measured, a photographic frame of the ground having been shot from on board is computed, and an image having been shot is transformed and pasted onto a map of the geographic information system in conformity with the photographic frame. At the time of executing a comparison between a shot image and a map is done, plural pieces of shot images are sampled in succession in cycles of a predetermined time period from images having been continuously shot. Then a series of plural images are pasted onto the map of the geographic information system to be displayed, and a target point of land is specified from the images pasted onto the map.

Figure 4:
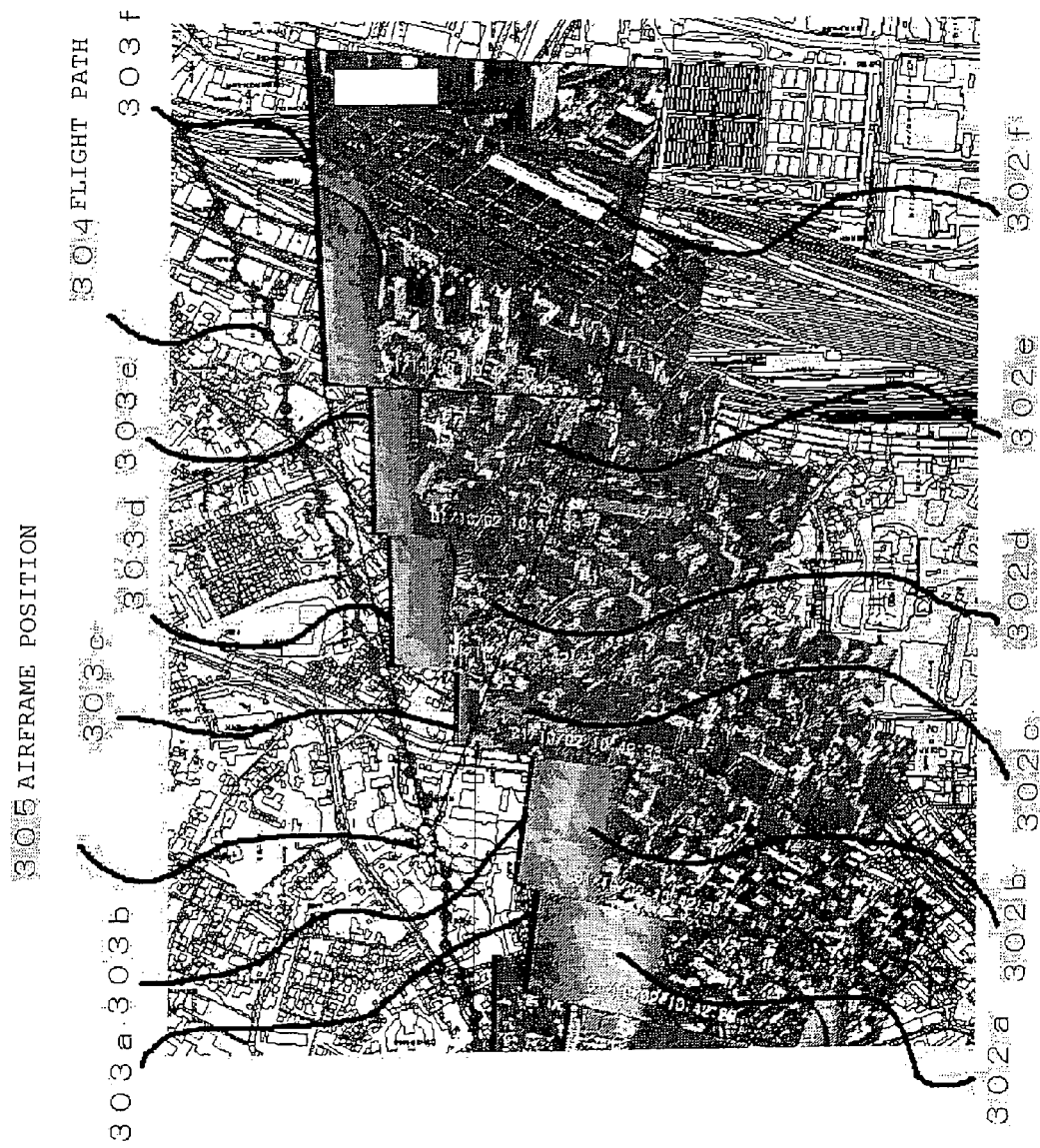
FIG. 4 is a photograph showing a display screen obtained by an image display method and an image display apparatus according to a second embodiment of the invention.
Figure 6A:
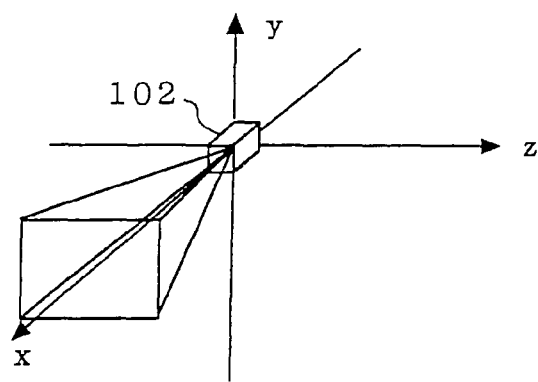
FIG. 6 are diagrams explaining map processing in the third embodiment.
Figure 6B:
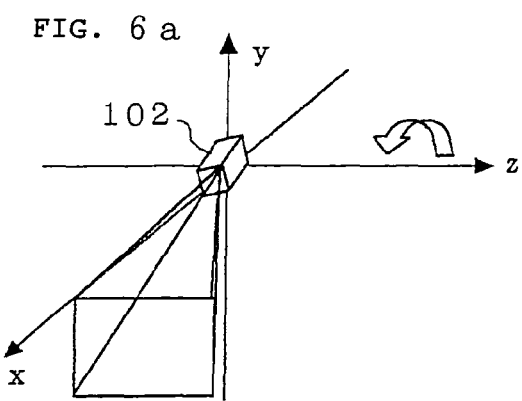
Figure 6C:
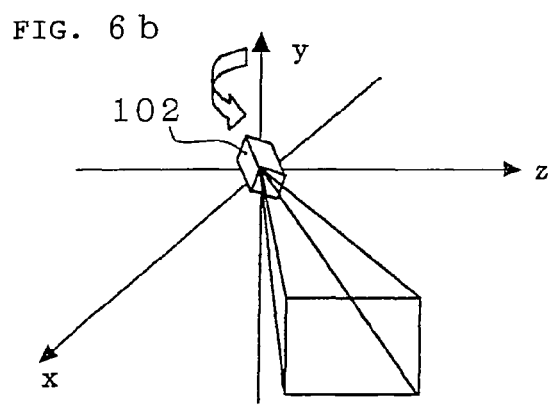
Figure 6D:
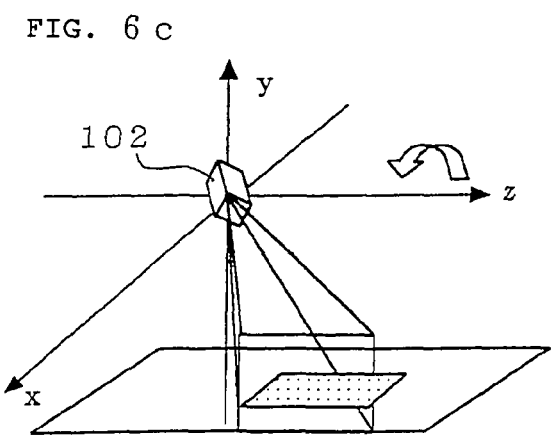

FIG. 4 shows a monitor display screen according to this method. Numeral 304 designates a flight path of the airframe. Numeral 305 designates an airframe position (camera position). Images having been shot with the camera along the flight path 304 are sampled with a predetermined timing to obtain each image frame, and the shot images are transformed and processed so as to conform to the image frames and pasted onto the map 301. Numerals 302a to 302f are pasted images. Numerals 303a to 303f are image frames thereof.

The computation of a photographic frame and the transformation of an image into each image frame are executed by computing with the use of camera information and posture information of the airframe at the time of taking a shot as described in the first embodiment. It is preferable that a sampling period for each image is changed in accordance with a speed of the airframe. Normally, a sampling period is set to be shorter when the airframe flies at high speed, and the sampling period is set to be longer when the airframe flies at low speed.

According to this second embodiment, it becomes possible to identify situations on the ground while confirming the situations of a wide range of ground surface with a map and plural pieces of continuous images, thereby enabling to determine a target point of land more effectively.

Embodiment 3

According to this third embodiment, a current position of the airframe 101 and a rotation angle and inclination (pan and tilt=posture of the camera) of the camera 102 with respect to the airframe are measured, and a photographic frame of the ground having been shot from on board is computed based on this camera posture. Then the image having been shot are transformed and pasted onto a map of the geographic information system in conformity with this photographic frame, and the comparison between the shot image and map is executed.

According to this third embodiment, a photographic frame is computed based on posture of the camera acting as photographic means, thereby enabling to identify situations of the ground with higher precision while confirming a positional relation between the shot image and the map.

Now, relations between the airframe 101 and the camera 102 are shown in FIG. 5. On the assumption that the camera 102 is housed in the gimbal 112, and the airframe 101 flies level, as shown in FIGS. 5(b) and (c), an inclination of the camera 102 is outputted as an inclination of the airframe 101 with respect to a central axis (=tilt), and a rotation angle (pan) of the camera 102 is outputted as a rotation angle from a traveling direction of the airframe 101. That is, in the state of (b), the camera 102 faces right below so that an inclination is 0 degree. In the state of (c), an inclination θ of the camera 102 is shown to be an inclination with respect to the vertical plane.

The method of computing a photographic frame of the camera can be obtained with rotational movement and projection processing of a rectangle (image frame) in 3D coordinates as a basis of computer graphics. Basically, a photographic frame of the camera is processed by transformation between camera information and airframe information, and a graphic frame in the case of projecting this photographic frame to the ground is computed, thereby enabling to obtain an intended image frame. A method of computing each coordinate in 3D coordinates is obtained by using the following matrix calculation method.

1) Computing a Photographic Frame in the Reference State

First, as shown in FIG. 6(*a*), positions of four points of an image frame are computed as relative coordinates, letting a position of the airframe an origin. The photographic frame is computed into a reference position based on a focal length, angle of view and altitude of the camera thereby obtaining coordinates of four points.

2) Computing Positions of Four Points After the Rotation About a Tilt of the Camera (Z-axis)

As shown in FIG. 6(*b*), a photographic frame is rotated about Z-axis in accordance with a tilt angle θ of the camera. Coordinates after rotation are obtained by transformation with the following expression 1.

$$[x' \ y' \ z' \ 1] = [x \ y \ z \ 1] \begin{bmatrix} \cos\theta & \sin\theta & 0 & 0 \\ -\sin\theta & \cos\theta & 0 & 0 \\ 0 & 0 & 1 & 0 \\ 0 & 0 & 0 & 1 \end{bmatrix} \quad \text{[Expression 1]}$$

3) Computing Positions of Four Points After the Rotation About an Azimuth of the Camera (y-axis)

As shown in FIG. 6(*c*), a photographic frame is rotated about y-axis in accordance with an azimuth θ of the camera. Coordinates after the rotation are obtained by transformation with the following expression 2.

$$[x' \ y' \ z' \ 1] = [x \ y \ z \ 1] \begin{bmatrix} \cos\theta & 0 & -\sin\theta & 0 \\ 0 & 1 & 0 & 0 \\ \sin\theta & 0 & \cos\theta & 0 \\ 0 & 0 & 0 & 1 \end{bmatrix} \quad \text{[Expression 2]}$$

4) Calculating a Graphic Frame of Projecting the Image Frame After Rotational Processing from an Origin (Airframe Position) to the Ground Surface (y-axis Altitude Point)

As shown in FIG. 6(*d*), a projection plane (photographic frame) is obtained by projecting the photographic frame to the ground surface (y-axis altitude). Coordinates after projection are obtained by transformation with the following expression 3.

$$[x' \ y' \ z' \ 1] = [x \ y \ z \ 1] \begin{bmatrix} 1 & 0 & 0 & 0 \\ 0 & 1 & 0 & 1/d \\ 0 & 0 & 1 & 0 \\ 0 & 0 & 0 & 0 \end{bmatrix} \quad \text{[Expression 3]}$$

Generalized homogenous coordinate system [X,Y, Z, W] is obtained with the following expression 4. In addition, d is a sea level altitude.

$$[X\ Y\ Z\ W] = [x\ y\ z\ y/d] \quad \text{[Expression 4]}$$

Next, the expression 4 is divided by W' (=y/d) and returned to be in 3D, resulting in the following expression 5.

$$\left[\frac{X}{W} \ \frac{Y}{W} \ \frac{Z}{W} \ 1\right] = \quad \text{[Expression 5]}$$
$$[xp \ yp \ zp \ 1] = \left[\frac{x}{y/d} \ d \ \frac{z}{y/d} \ 1\right]$$

Embodiment 4

According to this fourth embodiment, a current position of the airframe 101 and an elevation angle and roll angle of the airframe 101 are measured, and a photographic frame of the ground having been shot from on board is computed based on the elevation angle and roll angle. Then an image having been shot is transformed and pasted onto a map of the geographic information system in conformity with the photographic frame thereof, and the comparison between the shot image and the map is executed. According to this fourth embodiment, a photographic frame is computed based on the positional information of the airframe 101 with respect to the ground, thereby enabling to identify situations of the ground with higher precision while confirming a positional relation between the shot image and map.

Figure 7A:
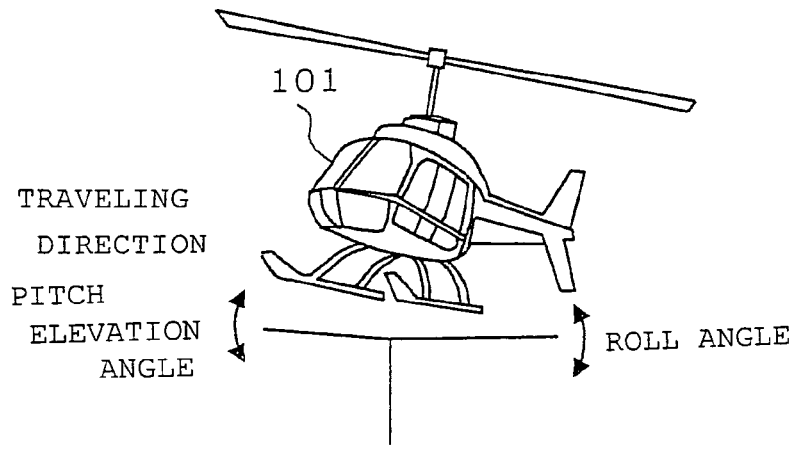
FIG. 7 are views explaining a fourth embodiment of the invention.
Figure 7B:
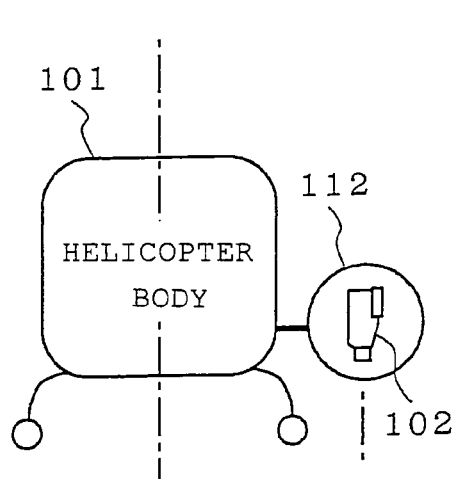
Figure 7C:
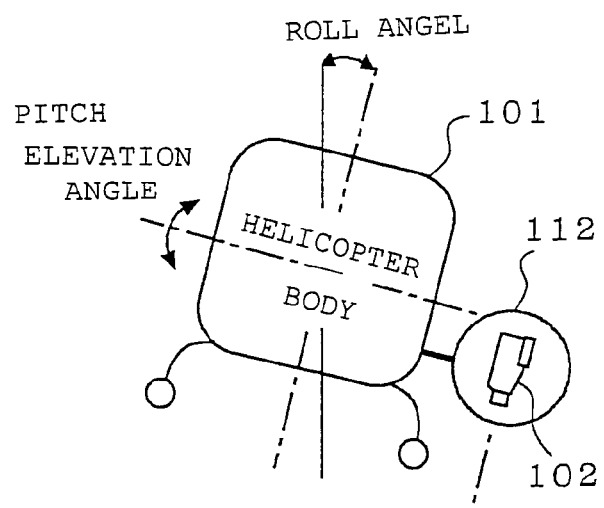
Figure 8A:
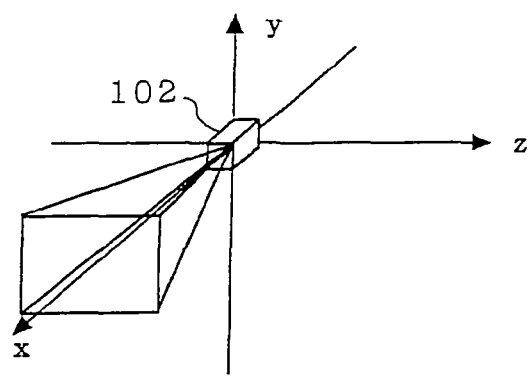
FIG. 8 are diagrams explaining map processing in the fourth embodiment.
Figure 8B:
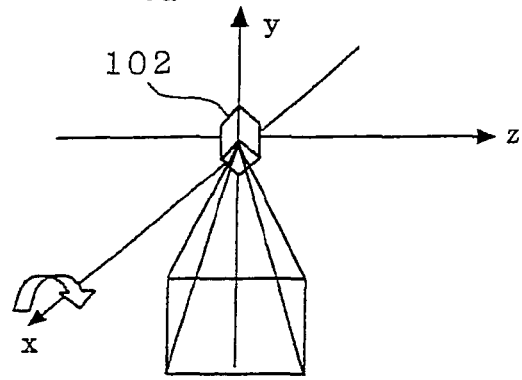
Figure 8C:
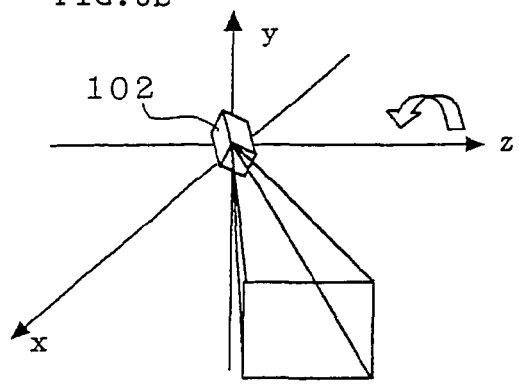
Figure 8D:
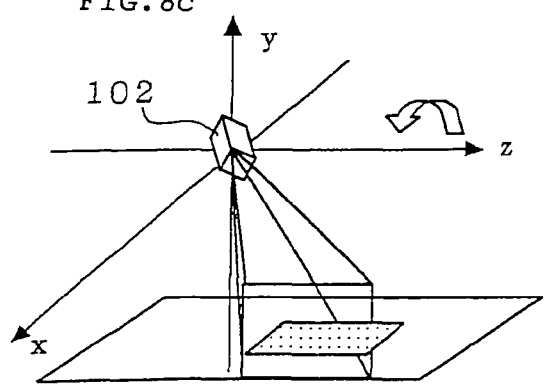

Now, as to relation between the airframe and the camera, let it be assumed that the camera 102 is fixed to the airframe 101 (that is, the gimbal is not used) as shown in FIG. 7. In the case where the airframe 101 itself flies horizontally to the ground as shown in FIG. 7(*b*), the camera 102 faces right below so that inclination of the camera 102 becomes 0 degree. In the case where the airframe 101 is inclined as shown in FIG. 7(*c*), this inclination gives a posture of the camera 102 and, therefore, a photographic frame of the camera is computed based on an elevation angle (pitch) and roll angle of the airframe 101.

1) Computing a Photographic Frame in the Reference State

As shown in FIG. 8(*a*), positions of four points of an image frame are computed as relative coordinates, letting a position of the airframe an origin. The photographic frame is computed into a reference position based on a focal length, angle of view, and altitude of the camera, thereby obtaining coordinates of four points.

2) Computing Positions of Four Points After the Rotation About a Roll of the Airframe (x-axis)

As shown in FIG. 8(*b*), the photographic frame is rotated about x-axis in accordance with a roll angle θ of the airframe with the following expression. Coordinates after rotation are obtained by transformation with the following expression 6.

$$[x' \ y' \ z' \ 1] = [x \ y \ z \ 1] \begin{bmatrix} 1 & 0 & 0 & 0 \\ 0 & \cos\theta & \sin\theta & 0 \\ 0 & -\sin\theta & \cos\theta & 0 \\ 0 & 0 & 0 & 1 \end{bmatrix} \quad \text{[Expression 6]}$$

3) Computing Positions of Four Points After the Rotation About a Pitch of the Airframe (z-axis)

As shown in FIG. 8(*c*), the photographic frame is rotated about the z-axis in accordance with a pitch angle θ of the airframe. Coordinates after rotation are obtained by transformation with the following expression 7.

$$[x'\ y'\ z'\ 1] = [x\ y\ z\ 1] \begin{bmatrix} \cos\theta & \sin\theta & 0 & 0 \\ -\sin\theta & \cos\theta & 0 & 0 \\ 0 & 0 & 1 & 0 \\ 0 & 0 & 0 & 1 \end{bmatrix} \quad \text{[Expression 7]}$$

4) Calculating a Graphic Frame of Projecting the Image Frame After Rotation Processing From an Origin (Airframe Position) to a Ground Surface (y-axis Altitude Point)

As shown in FIG. 8(*d*), a projection plane (photographic frame) is obtained by projecting the photographic frame to the ground surface (y-axis altitude). Coordinates after projection are obtained by transformation with the following expression 8.

$$[x'\ y'\ z'\ 1] = [x\ y\ z\ 1] \begin{bmatrix} 1 & 0 & 0 & 0 \\ 0 & 1 & 0 & 1/d \\ 0 & 0 & 1 & 0 \\ 0 & 0 & 0 & 0 \end{bmatrix} \quad \text{[Expression 8]}$$

Generalized homogenous coordinate system [X, Y, Z, W] is obtained with the following expression 9.

$$[X\ Y\ Z\ W] = [x\ y\ z\ y/d] \quad \text{[Expression 9]}$$

Next, the expression 9 is divided by W' (=y/d) and returned to be in 3D resulting in the following expression 10.

$$\left[\frac{X}{W}\ \frac{Y}{W}\ \frac{Z}{W}\ 1\right] = \quad \text{[Expression 10]}$$
$$[xp\ yp\ zp\ 1] = \left[\frac{x}{y/d}\ d\ \frac{z}{y/d}\ 1\right]$$

Embodiment 5

In this fifth embodiment, a current position of the airframe 101, a rotation angle and inclination of the camera 102 with respect to the airframe, and further an elevation angle and roll angle of the airframe 101 are measured, and a photographic frame of the ground having been shot from on board is computed based on the information. Then an image having been shot is transformed and pasted onto a map of the geographic information system in conformity with the photographic frame thereof, and the comparison between the image and the map is executed. According to this fifth embodiment, a photographic frame is computed based on posture information of the camera and posture information of the airframe, thereby enabling to identify situations of the ground with higher precision while confirming a positional relation between the image and map.

Figures 9A, 9B:
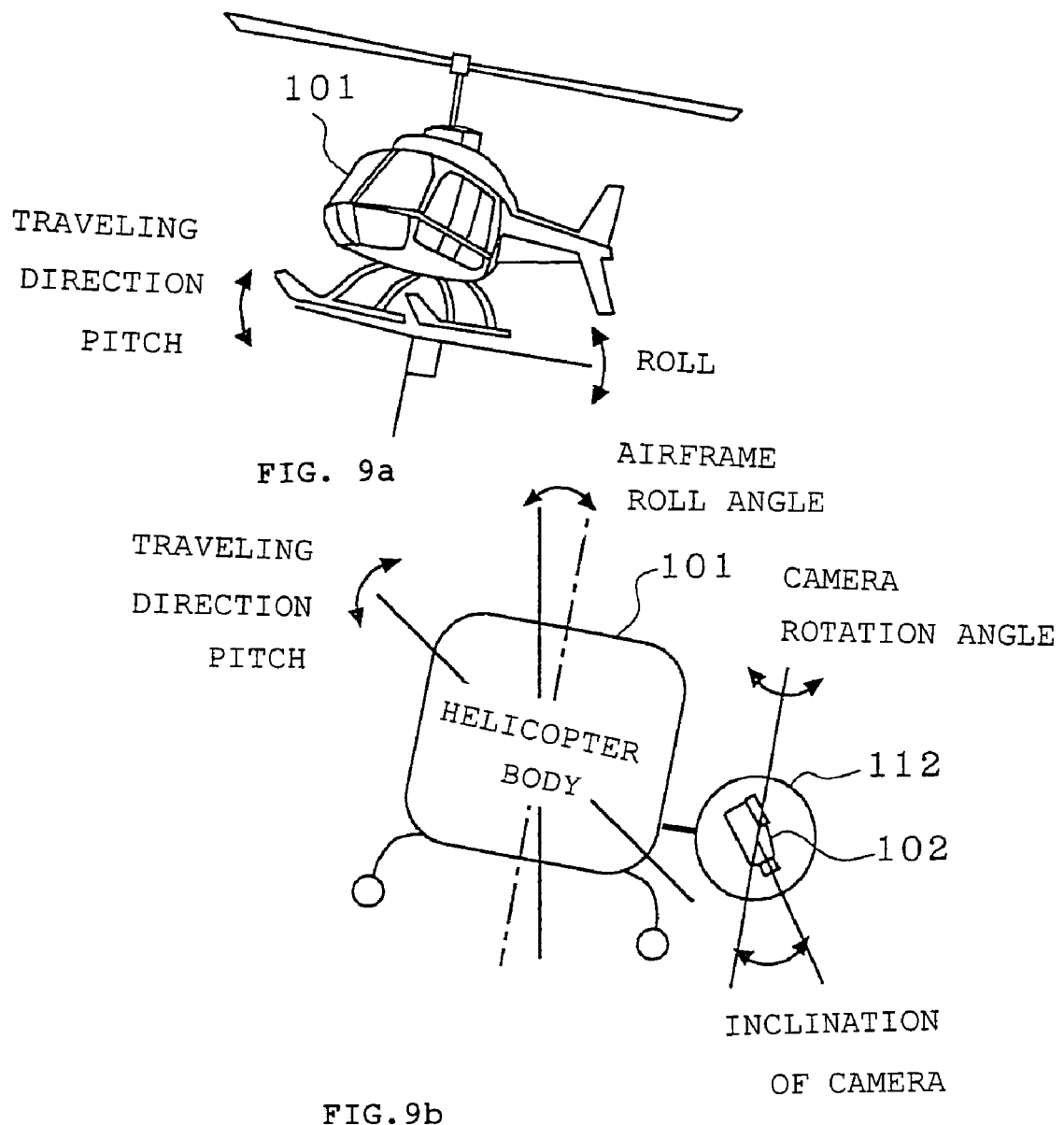
FIG. 9 are views explaining a fifth embodiment of the invention.

Now, as to relation between the airframe 101 and the camera 102, supposing that the camera 102 is housed in the gimbal 112 as well as the airframe 101 flies in any posture as shown in FIG. 9, an inclination and rotation angle of the camera 102 are outputted from the gimbal 112 as shown in FIG. 8(*b*). Furthermore, an elevation angle and roll angle of the airframe 101 itself with respect to the ground are outputted from the gyro.

The method of computing a photographic frame of the camera can be obtained with rotational movement and projection processing of a rectangle (image frame) in 3D coordinates as a basis of computer graphics. Basically, a photographic frame of the camera are processed by transformation with camera information and airframe information, and a graphic frame in the case of projecting this photographic frame to the ground is computed, thereby enabling to obtain an intended image frame.

The method of calculating each coordinate in 3D coordinates is obtained by using the following matrix calculation method.

1) Computing a Photographic Frame in the Reference State

As shown in FIG. 10(*a*), positions of four points of an image frame are computed as relative coordinates, letting a position of the airframe an origin. A photographic frame is computed into a reference position based on a focal length, angle of view, and altitude of the camera thereby obtaining coordinates of four points.

2) Computing Positions of Four Points After the Rotation About a Tilt of the Camera (Z-axis)

As shown in FIG. 10(*b*), transformation of rotating a shot image about Z-axis in accordance with a tilt angle θ of the camera is executed. Coordinates after rotation are obtained by transformation with the following expression 11.

$$[x'\ y'\ z'\ 1] = [x\ y\ z\ 1] \begin{bmatrix} \cos\theta & \sin\theta & 0 & 0 \\ -\sin\theta & \cos\theta & 0 & 0 \\ 0 & 0 & 1 & 0 \\ 0 & 0 & 0 & 1 \end{bmatrix} \quad \text{[Expression 11]}$$

3) Computing Positions of Four Points After the Rotation About an Azimuth of the Camera (y-axis)

As shown in FIG. 10(*c*), transformation of rotating a photographic frame about y-axis in accordance with an azimuth θ of the camera is executed. Coordinates after rotation are obtained by transformation with the following expression 12.

$$[x'\ y'\ z'\ 1] = [x\ y\ z\ 1] \begin{bmatrix} \cos\theta & 0 & -\sin\theta & 0 \\ 0 & 1 & 0 & 0 \\ \sin\theta & 0 & \cos\theta & 0 \\ 0 & 0 & 0 & 1 \end{bmatrix} \quad \text{[Expression 12]}$$

4) Computing Positions of Four Points After the Rotation About a Roll of the Airframe (x-axis)

As shown in FIG. 10(*d*), transformation of rotating a photographic frame about x-axis in accordance with a roll angle θ of the airframe is executed. Coordinates after rotation are obtained by transformation with the following expression 13.

$$[x'\ y'\ z'\ 1] = [x\ y\ z\ 1] \begin{bmatrix} 1 & 0 & 0 & 0 \\ 0 & \cos\theta & \sin\theta & 0 \\ 0 & -\sin\theta & \cos\theta & 0 \\ 0 & 0 & 0 & 1 \end{bmatrix} \quad \text{[Expression 13]}$$

5) Computing Positions of Four Points After the Rotation About a Pitch of the Airframe (z-axis)

As shown in FIG. 10(*e*), transformation of rotating a photographic frame about z-axis in accordance with a pitch angle θ of the airframe is executed. Coordinates after rotation are obtained by transformation with the following expression 14.

$$[x'\ y'\ z'\ 1] = [x\ y\ z\ 1]\begin{bmatrix} \cos\theta & \sin\theta & 0 & 0 \\ -\sin\theta & \cos\theta & 0 & 0 \\ 0 & 0 & 1 & 0 \\ 0 & 0 & 0 & 1 \end{bmatrix}$$ [Expression 14]

6) Calculating a Graphic Frame of Projecting the Image Frame After Rotational Processing from an Origin (Airframe Position) to a Ground Surface (y-axis Altitude Point)

Figure 10A:
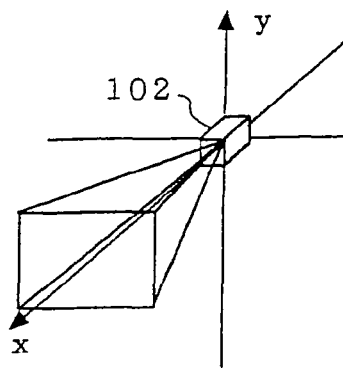
FIG. 10 are diagrams explaining map processing in the fifth embodiment.
Figure 10D:
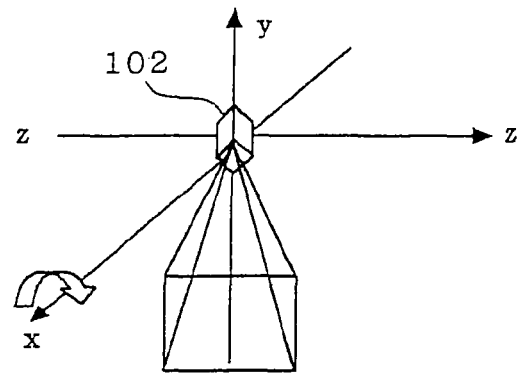
Figure 10B:
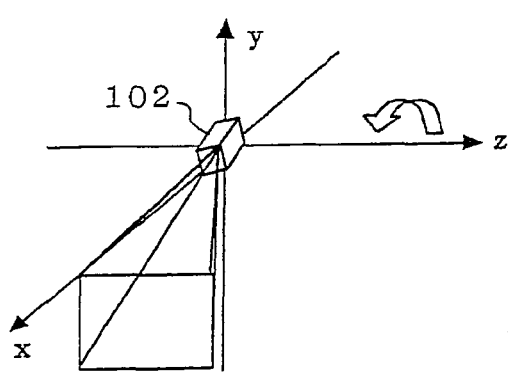
Figure 10E:
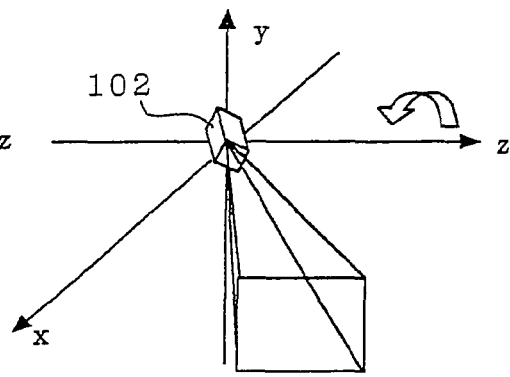
Figure 10C:
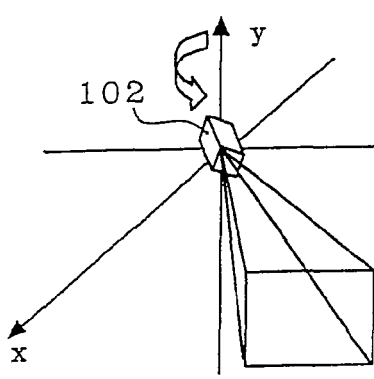
Figure 10F:
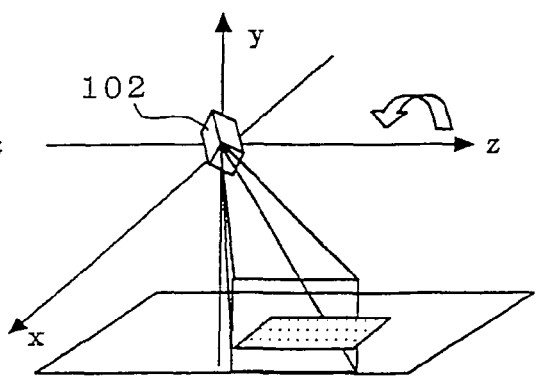

As shown in FIG. 10(f), a projection plane (photographic frame) is obtained by projecting the photographic frame to the ground surface (y-axis altitude). Coordinates after projection are obtained by transformation with the following expression 15.

$$[x'\ y'\ z'\ 1] = [x\ y\ z\ 1]\begin{bmatrix} 1 & 0 & 0 & 0 \\ 0 & 1 & 0 & 1/d \\ 0 & 0 & 1 & 0 \\ 0 & 0 & 0 & 0 \end{bmatrix}$$ [Expression 15]

7) Generalized Homogenous Coordinate System [X, Y, Z, W] is Obtained with the Following Expression 16.

$$[X\ Y\ Z\ W] = [x\ y\ z\ y/d]$$ [Expression 16]

8) Next, the Expression 16 is Divided by W'(=y/d) and Returned to be in 3D Resulting in the Following Expression 17.

$$\left[\frac{X}{W}\ \frac{Y}{W}\ \frac{Z}{W}\ 1\right] = [xp\ yp\ zp\ 1]$$
$$= \left[\frac{x}{y/d}\ d\ \frac{z}{y/d}\ 1\right]$$ [Expression 17]

Embodiment 6

In this sixth embodiment, a current position of the airframe 101, a rotation angle and inclination of the camera 102 with respect to the airframe, and further an elevation angle and roll angle of the airframe 101 are measured, and a photographic frame of the ground having been shot from on board is computed into a map of the geographic information system. In computing processing of four points of this photographic frame, topographic altitude data is utilized, and a flight position of the airframe 101 is compensated to compute the photographic frame. Then an image having been shot is transformed in conformity with the photographic frame thereof and pasted onto a map of the geographic information system, and the comparison between the shot image and map is executed.

According to this sixth embodiment, the compensation is executed with altitude topographic information of the surface ground using information about a position and altitude of the airframe, airframe posture information and posture information of the camera, and a photographic frame is computed, thereby enabling to identify with higher precision situations of the ground while confirming a positional relation between the image and the map.

Figure 11:
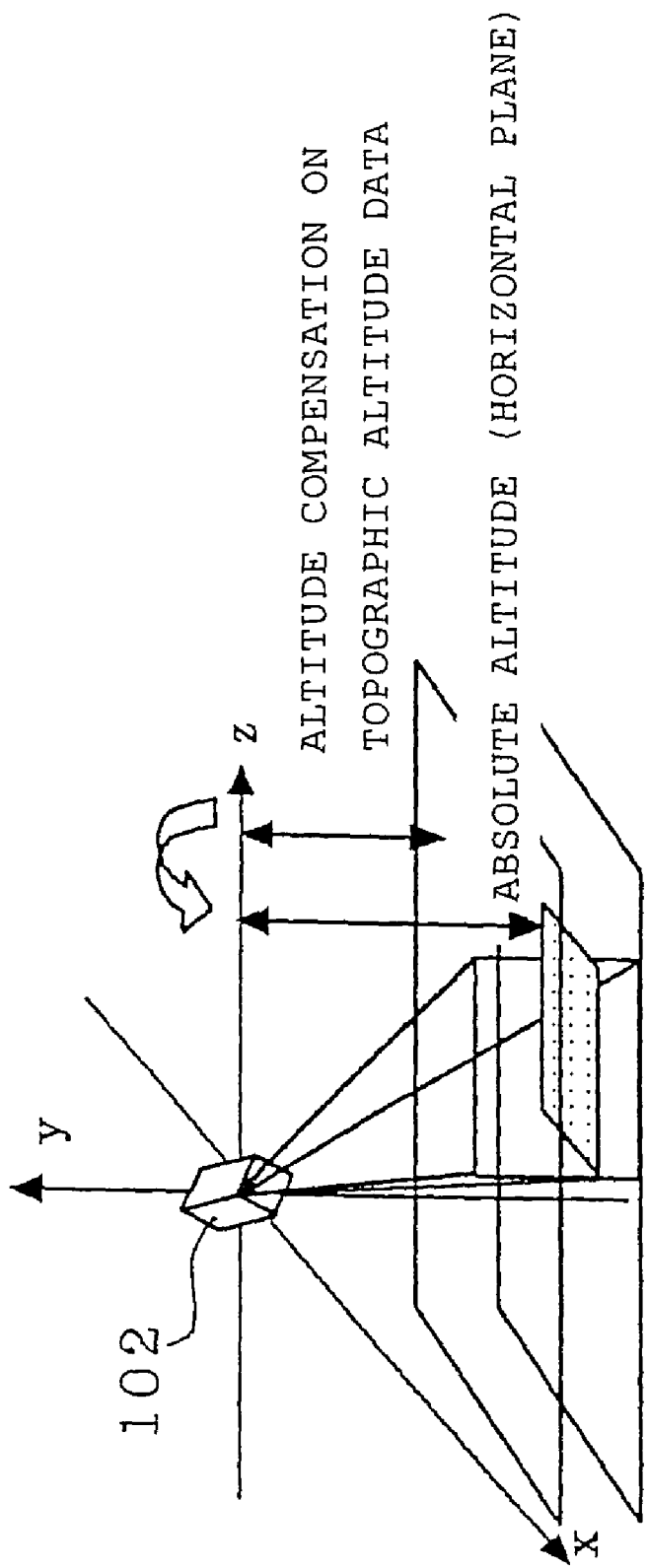
FIG. 11 is a diagram for explaining map processing of an image display method and an image display apparatus according to a sixth embodiment of the invention.

In the foregoing fifth embodiment, a sea level altitude obtained from the GPS is employed as an altitude of the airframe in computing processing of a photographic frame onto the ground surface after rotation: whereas, in this sixth embodiment, as shown in FIG. 11, a ground surface altitude (relative altitude d=sea level altitude−ground surface altitude) at a shooting point is employed as an altitude of the airframe utilizing a topographic altitude information of the ground surface. In this manner, computing four points of a photographic frame is executed.

1) Calculating a Graphic Frame of Projecting an Image Frame After Rotational Processing from an Origin (Airframe Position) to the Ground Surface (y-axis Altitude Point)

A projection plane is obtained by projecting the photographic frame to the ground surface (y-axis altitude). Coordinates after projection are obtained by transformation with the following expression 18.

$$[x'\ y'\ z'\ 1] = [x\ y\ z\ 1]\begin{bmatrix} 1 & 0 & 0 & 0 \\ 0 & 1 & 0 & 1/d \\ 0 & 0 & 1 & 0 \\ 0 & 0 & 0 & 0 \end{bmatrix}$$ [Expression 18]

Generalized homogenous coordinate system [X, Y, Z, W] is obtained with the following expression 19.

$$[X\ Y\ Z\ W] = [x\ y\ z\ y/d]$$ [Expression 19]

Next, the expression 19 is divided by W'(=y/d) and restored to be in 3D resulting in the following expression 20.

$$\left[\frac{X}{W}\ \frac{Y}{W}\ \frac{Z}{W}\ 1\right] = [xp\ yp\ zp\ 1]$$
$$= \left[\frac{x}{y/d}\ d\ \frac{z}{y/d}\ 1\right]$$ [Expression 20]

A relative altitude d, which is used herein, is obtained by subtracting a topographic altitude at a target point of land from an absolute altitude from the horizon, which is obtained from the GPS. Further this relative altitude from the camera is utilized, thereby enabling to compute with higher precision the position of a photographic frame.

Embodiment 7

In this seventh embodiment, at the time of measuring a current position of the airframe 101, computing a photographic frame of the ground having been shot from on board on a map of the geographic information system, transforming an image having been shot in conformity with the photographic frame thereof and pasting it, and executing the comparison between the shot image and map, plural pieces of shot images to be pasted in succession on the map are displayed being pasted continuously onto the map of the geographic information system. Then a target point of land is specified with the pasted images on the map.

In the processing of pasting plural pieces of shot images onto a map of the geographic information system, the layout is performed in accordance with the computed photographic frames, a joint state of overlap part of each shot image is confirmed, and the images are moved so that overlap condition of the images may be of the largest extent to execute the positional compensation. Then, the shot images are transformed in conformity with the photographic frames on the map of the geographic information system with the use of the compensation values, and paste processing is performed.

Figure 12:
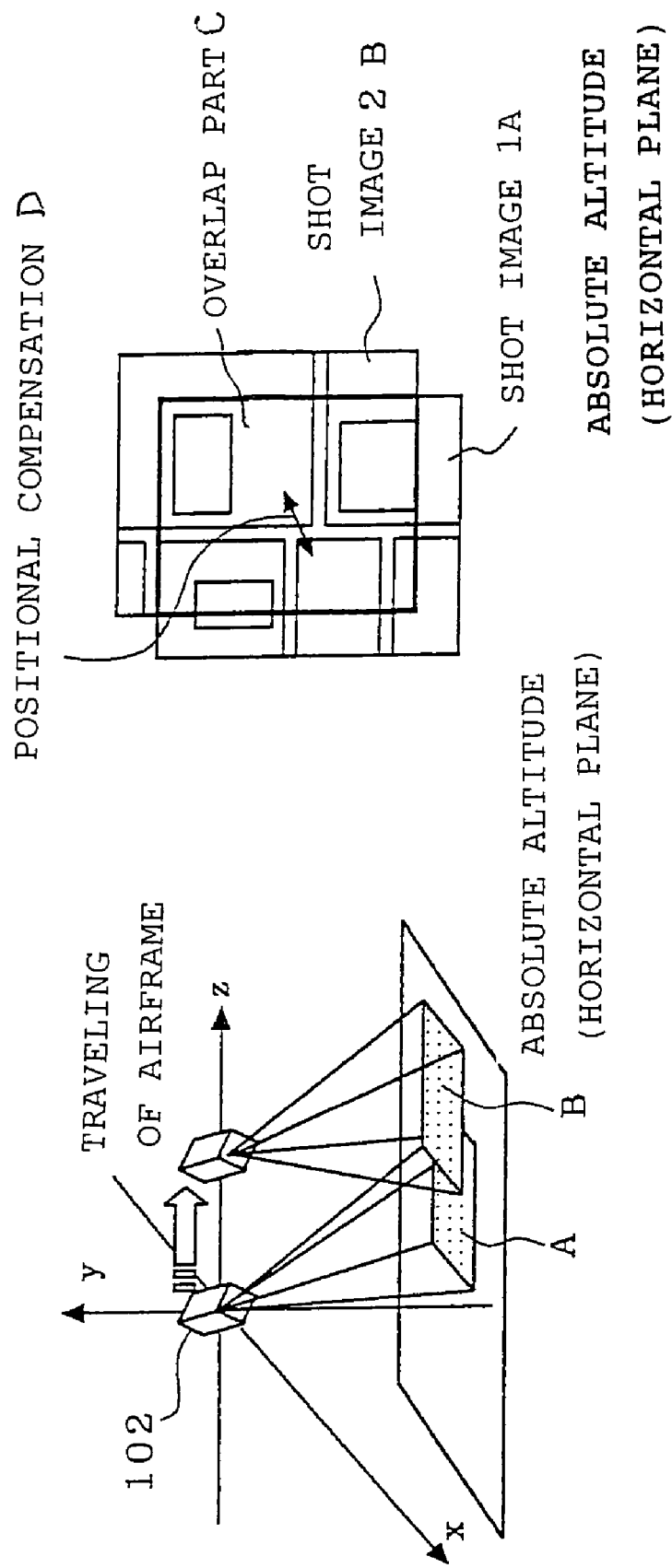
FIG. 12 is a view for explaining map processing of an image display method and an image display apparatus according to a seventh embodiment of the invention.

Procedures thereof are shown in FIG. 12. For example, two pieces of shot images 1(A) and 2(B), which are taken as the airframe 101 travels, are overlapped, and an overlap part (internal part of a solid frame C of the drawing) is detected. Then the images A and B are moved relatively so that the overlap condition of the images may be of the largest extent, a positional compensation value at the time of joining is obtained, the positional compensation D is executed, and the images A and B are joined. The positional compensation is carried out in image•joining compensation 215 of FIG. 2.

According to this seventh embodiment, plural pieces of continuous images provide a more precise joining, thereby enabling to identify situations of the ground while confirming situations of a wider range of ground surface.

Embodiment 8

In this eighth embodiment, a current position of the airframe 101, a mounting angle and inclination of the camera 102 with respect to the airframe, and further an elevation angle and roll angle of the airframe 101 are measured. Then a photographic frame of the ground having been shot from on board is computed, the image is transformed in conformity with the photographic frame thereof to be pasted onto a map of the geographic information system, and the comparison between the sot image and map is executed.

In the case of executing this processing, it comes to be important that various information, which are transmitted from the on-board system 100, are received at the ground system 200 fully in synchronization. To achieve this synchronization, it is necessary to adjust a processing time period such as processing time period of flight position measurement means, processing time period of posture measurement means with the gimbal of camera and a processing time period of image transmission, and to transmit them in synchronization with the shot image. To actualize this synchronization, a buffer is provided in the construction of FIG. 1, and image signals of the camera on board are temporarily stored with storage means 113 in this buffer and transmitted to the ground system 200 in synchronization with the forgoing information after the delay of a computing time period for airframe positional detection by, e.g., GPS.

This relation is described with reference to FIG. 13. A time period T is required for the airframe 101 to receive a GPS signal and detect an airframe position, and during this time period the airframe 101 travels from a position P1 to a position P2. Therefore at the instant of completing a positional detection of the airframe, a region, which the camera 102 shoots, comes to be a region apart from the region, which the camera 102 has shot at the position P1, by a distance R resulting in occurrence of error.

Figures 13A, 13B:
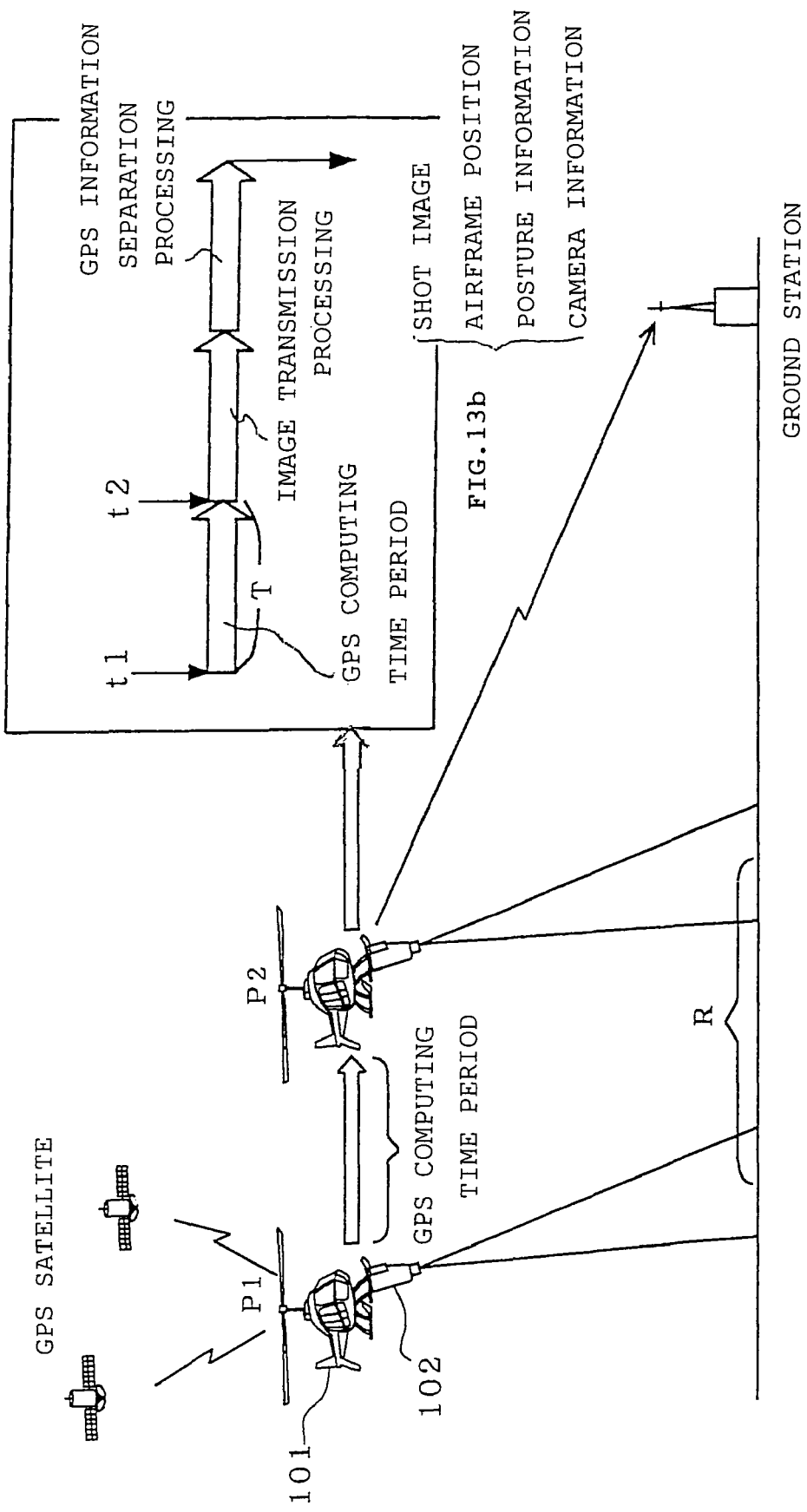
FIG. 13 are views explaining an image display method and an image display apparatus according to an eighth embodiment of the invention.

FIG. 13(b) is a time-chart showing procedures of correcting this error. An image signal is temporarily stored in the buffer during a GPS computing time period T from a GPS observation point t1 for airframe positional detection, and the image signal having been stored temporarily is transmitted together with airframe position, airframe posture, camera information and the like at the instant of t2.

According to this eighth embodiment, a photographic frame is computed based on mounting information of the photographic device, thereby enabling to identify with higher precision situations of the ground while confirming a positional relation between the image and map.

Further, according to each of the foregoing embodiments, an image frame is computed, thereafter a shot image is transformed in conformity with this image frame, and this transformed image is superposed and pasted onto a map. However, it is preferable that a photographic area on the map corresponding to a shot image, which photographic means has taken, is merely obtained, and the shot image is superposed on this area of the map to be displayed.

Furthermore, according to each of the foregoing embodiments, map processing is executed at the ground system based on information to be transmitted from the on-board system. However, this map processing is not limited thereto, and it is preferable that the on-board system is provided with a monitor such as display, the map processing is executed at the on-board system, and the processed map is displayed on the monitor of the on-board system; or that information having been processed is transmitted to the ground system, and displayed at the ground system.

Embodiment 9

According to this ninth embodiment, so-called land marks, for example, a cross point or station or a large building corner that show remarkable points on the map are extracted from a shot image; and the corresponding landmark is extracted from a region corresponding to the photographic area on the map. Further, parameters for image frame computing (hereinafter, showing information of airframe position, airframe posture and camera posture, and camera set information for use in computing a photographic frame, being a photographic area of the camera on the ground surface) are adjusted so that the landmarks of the image and the map may be in coincidence, whereby the image is transformed and displayed being superposed on a GIS screen with high precision.

Figure 14:
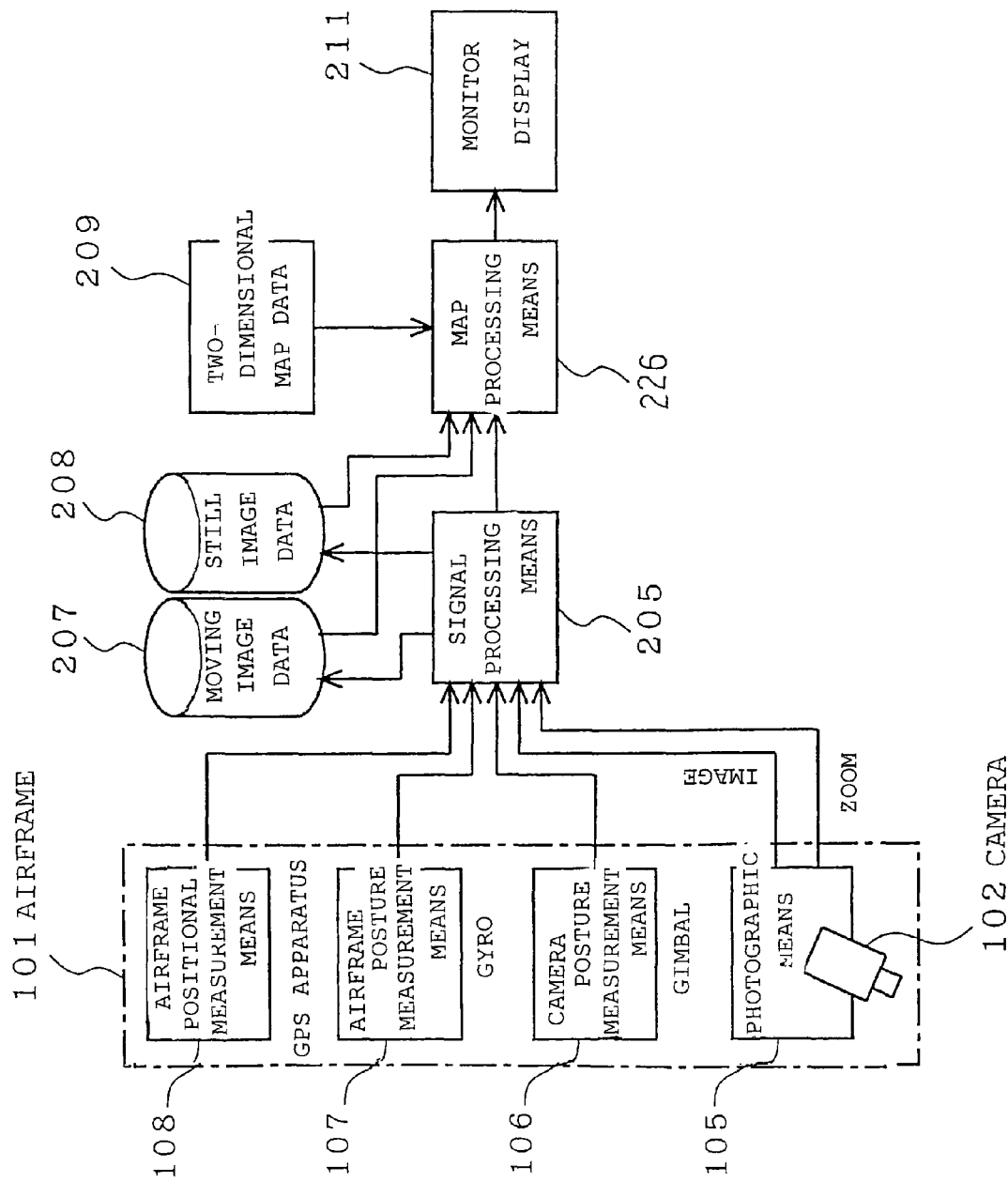
FIG. 14 is a block diagram showing an image display apparatus for carrying out an image display method according to a ninth embodiment of the invention.
Figure 15:
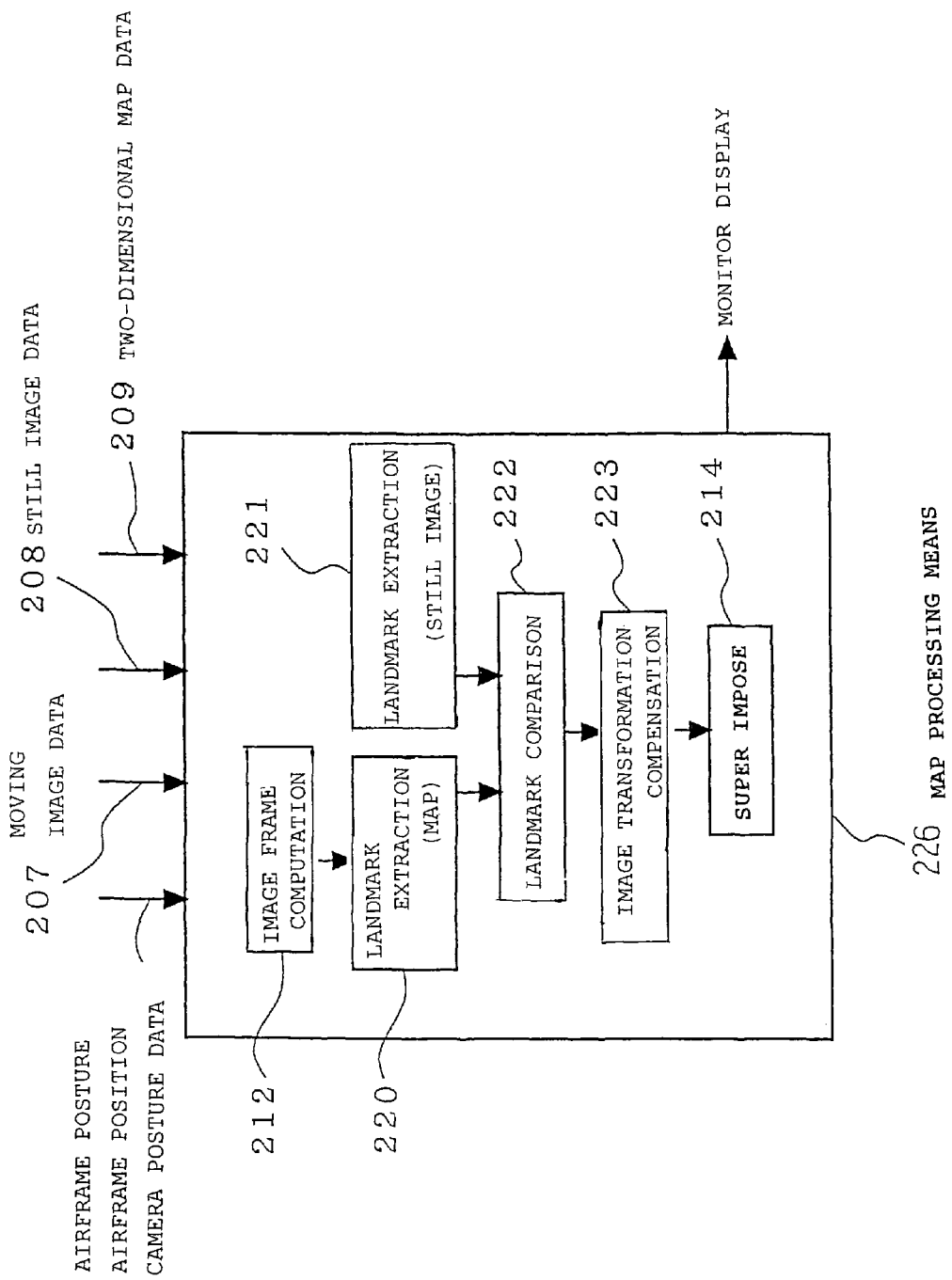
FIG. 15 is an explanatory diagram of functions of map processing means in the ninth embodiment.

Hereinafter, descriptions are made referring to the drawings. FIG. 14 is a block diagram showing the ninth embodiment. Additionally, in FIG. 14, diagrammatic representations of the antenna 103, multiplex modulator 109, signal conversion means 110, tracking means 111, temporary storage means 113, transmission means 104, receiving means 201, tracking means 202, signal conversion means 203, and multiplex demodulator 204 are omitted. FIG. 15 is a function explanatory diagram for explaining map processing means.

With reference to FIG. 14, current positional information is obtained with airframe position measurement means 108 such as GPS that is mounted on a flight vehicle (=airframe) such as helicopter, and the airframe positional measurement is performed. Furthermore, the airframe 101 comprises, e.g., gyro, and posture, i.e., an elevation angle (=pitch) and roll angle are measured with this airframe posture measurement means 107. Photographic means 105, being the camera 102 mounted on the airframe 101 takes a shot of the ground, and outputs image signals thereof as well as outputs camera information such as zoom of the camera. The camera 102 is attached to, e.g., gimbal, and a rotation angle (=pan) and inclination (=tilt) of the camera is measured with this camera posture measurement means 106.

Outputs from these airframe position measurement means 108, airframe posture measurement means 107, photographic means 105, and camera posture measurement means 106 are inputted to signal processing means 205 and signal-processed respectively. Image signals of camera shooting are converted to a moving image data 207 and a still image data 208. Outputs from the signal processing means 205 and a two-dimensional map data 209 are inputted to map processing means 226, and the map processing is executed.

The map processing means 226 includes functions shown in FIG. 15. In the map processing means 226, as shown in FIG. 15, the processing is executed based on a moving image data 207 and a still image data 208, being image signals, and information signals of airframe position, airframe posture, and camera posture, and a two-dimensional map data 209 of the geographic information system.

In the map processing means 226, first image frame computing 212 is executed, in which a shooting position in the air is specified three-dimensionally, and a photographic area (=photographic frame) of the ground surface having been shot is obtained by computation based on posture of the camera and airframe with respect to the ground surface. Then, landmark extraction 220 is executed to an extent corresponding to the photographic area and its vicinity on a map of the geographic information system, and landmark extraction 221 is executed also from a still image data 208. Landmark comparison 222 for causing these landmarks in coincidence is executed. Image transformation•compensation 223 is executed based on a result of the landmark comparison 222, and a superposed display position of a shot image onto the map is compensated. Thereafter, superposition 214 of the image on the map of the geographic information system is executed. Finally, this superposed picture is displayed on a monitor with monitor display means 211 such as CRT.

Figure 16:
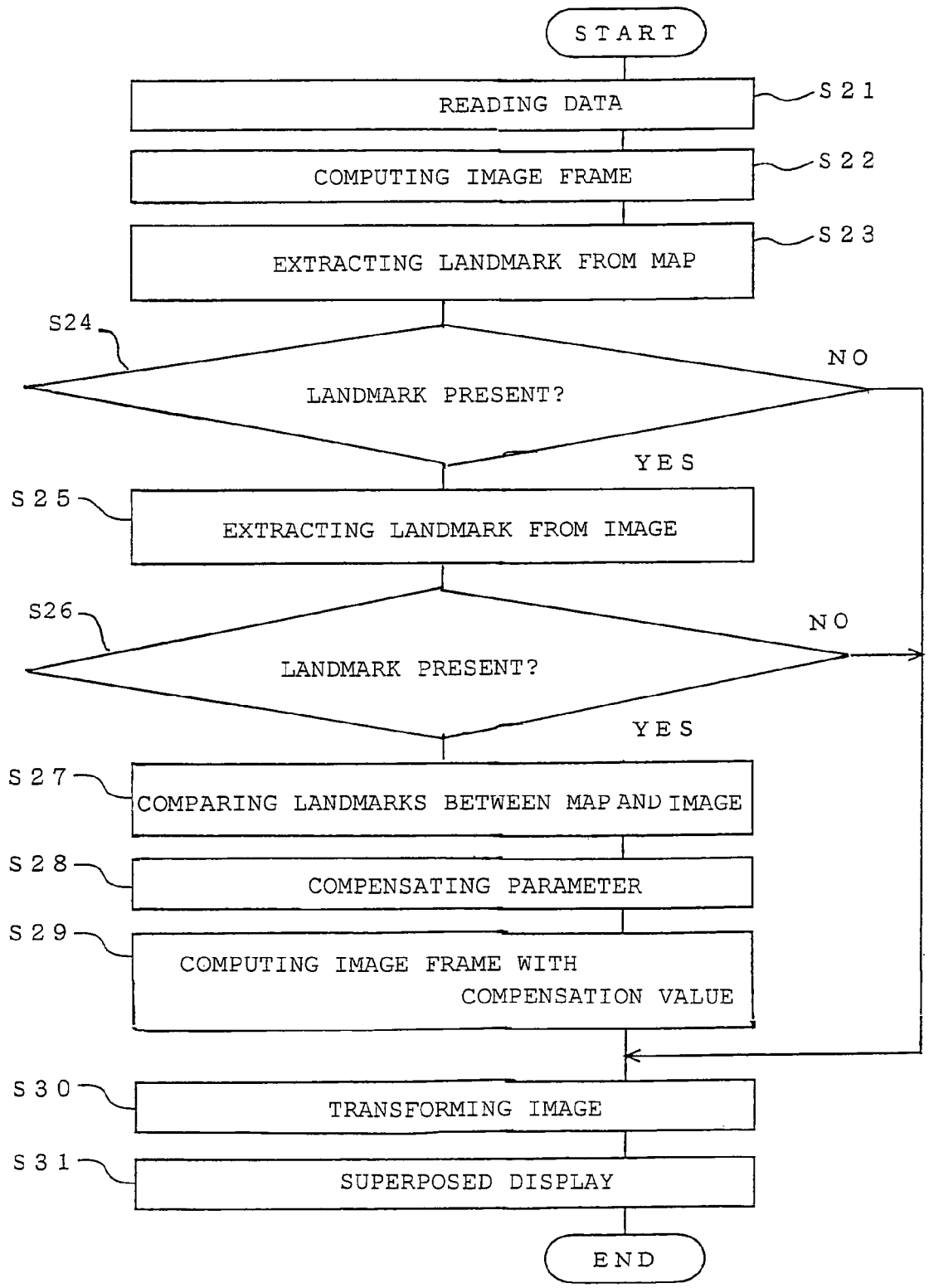
FIG. 16 is a flowchart showing operations in the image display method and the image display apparatus according to the ninth embodiment.

Now, operations are described based on a flowchart of FIG. 16. First, an airframe position, being an output from airframe position measurement means 108, a pitch elevation angle and roll angle, being an output from airframe posture measurement means 107, a pan and tilt, being an output from camera posture measurement means 106, a zoom of the camera 102, being an output from photographic means 105, a still image data 208 obtained with signal processing means 205, and a two-dimensional map data 209 are read in as input data respectively (S2). Next, the image frame computing 212 is executed using an airframe position, pitch elevation angle, roll angle, and a pan, tilt and zoom of the camera as parameters (S22). Subsequently, the landmark extraction on the map of a geographic information system is executed about a region corresponding to a photographic frame obtained by the image frame computing 212 (S23). In the case where any landmark is extracted in S23, the corresponding landmark is extracted from a still image data 208 (S24) (S25).

In the case where the landmark is extracted also from an image in S25, the corresponding landmarks that are obtained in S23 and S25 are compared with each other, and parameter (for example, pan tilt) values having been used in the image frame computing of S22 are compensated so that these landmarks are in coincidence (S26) (S27) (S28). Further, the photographic frame is computed again based on the compensation value of parameters having been obtained in S28, and a still image data 208 is transformed in conformity with this photographic frame and displayed being superposed on a map of the geographic information system (S29) (S30) (S31).

In the case where any landmark is not extracted in S23 or S25, a still image data 208 is transformed in conformity with a photographic frame obtained in S22, and displayed being superposed on a map of the geographic information system (S24) (S26) (S30) (S31). FIG. 17 shows a pitch elevation angle, rotation angle, and a pan and tile of the camera, being angle parameters for use in the image frame computation 212.

For the computing method of a photographic frame, the above-described method is employed. A photographic frame in the reference state is rotationally-processed with each angle parameter, and thereafter projected onto the ground surface, whereby a photographic area of the camera on the ground surface, that is, a photographic frame is obtained. As shown in FIG. 18, when x-axis is laid in airframe traveling direction, z-axis is laid in vertically upward direction with respect to the ground surface, and y-axis is laid so as to be vertical to these x-axis and z-axis, letting an airframe position an origin, the specific computation is as follows:

Computing a photographic frame in the reference state
Rotation about y-axis based on a tilt of the camera
Rotation about z-axis based on a pan of the cameral
Rotation about x-axis based on a roll angle of the airframe
Rotation about y-axis based on a pitch elevation angle of the airframe
Projection onto the ground surface (horizontal surface of absolute altitude (=sea level altitude) 0)

Figure 18A:
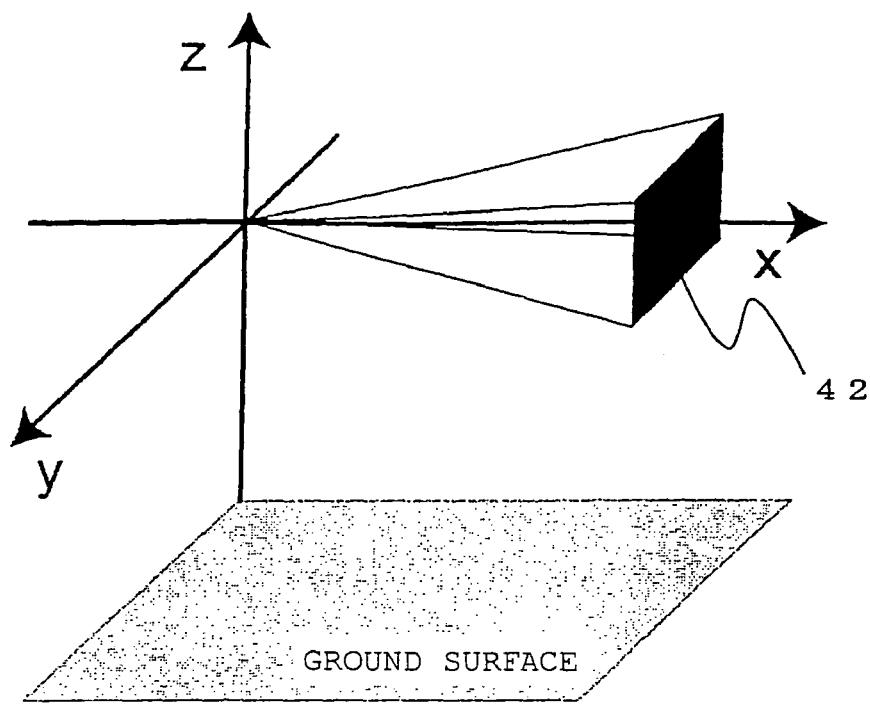
FIG. 18 are diagrams explaining the photographic frame computation in map processing means according to the ninth embodiment.
Figure 18B:
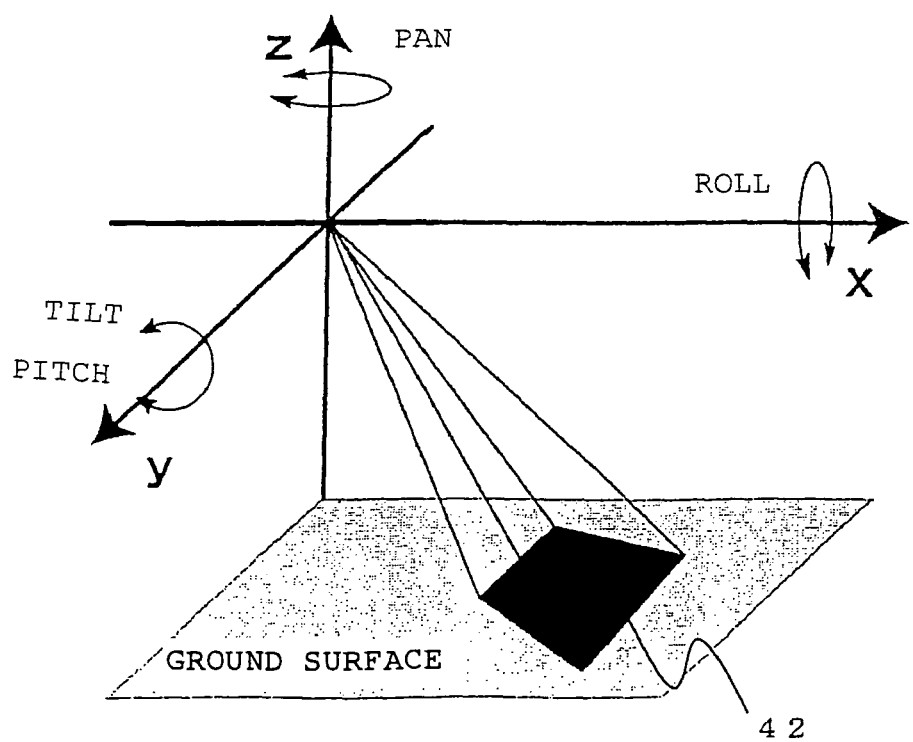

FIG. 18(a) shows the state in which a photographic frame 42 is computed into the reference state. FIG. 18(b) shows the state in which the photographic frame 42 of the reference state is rotationally processed with each angle parameter, and thereafter projected onto the ground surface.

Figure 19:
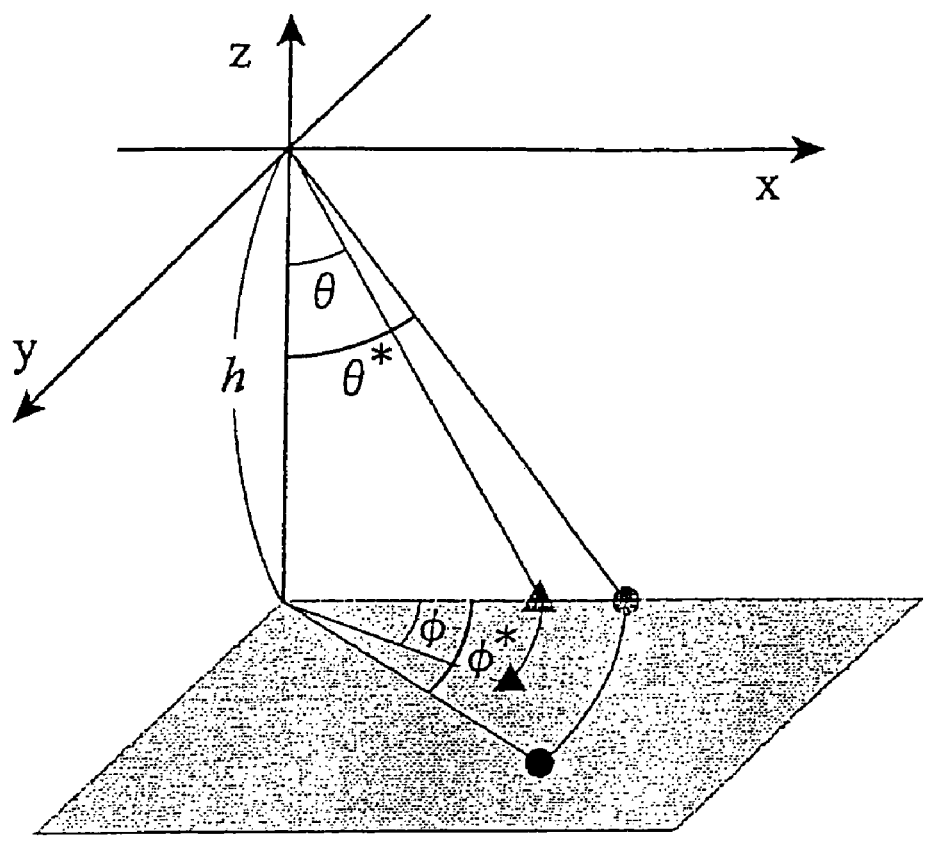
FIG. 19 is a diagram explaining parameter compensation in map processing means according to the ninth embodiment.

The method of compensating a pan and tilt of the camera is now described referring to FIG. 19. When letting an airframe altitude h, a measured value of tilt θ, a measured value of pan φ, landmark coordinates on an image (x, y) and landmark coordinates on the map $(x_0, y_0)$, values of tilt and pan after the compensation $\theta_0$, $\phi_0$ can be obtained by working out the following expression 21.

$$\begin{cases} h \cdot \tan\theta_0 \cdot \cos\phi_0 = x_0 \\ h \cdot \tan\theta_0 \cdot \sin\phi_0 = y_0 \end{cases} \quad \text{[Expression 21]}$$

where: landmark coordinates $(x_0, y_0)$ on the map to compare herein are coordinates after the following transformation.

Counter-rotation about y-axis based on a pitch elevation angle of the airframe
Counter-rotation about x-axis based on a roll angle of the airframe
Projection onto the ground surface (horizontal surface of absolute altitude (=sea level altitude) 0)

Figure 20A:
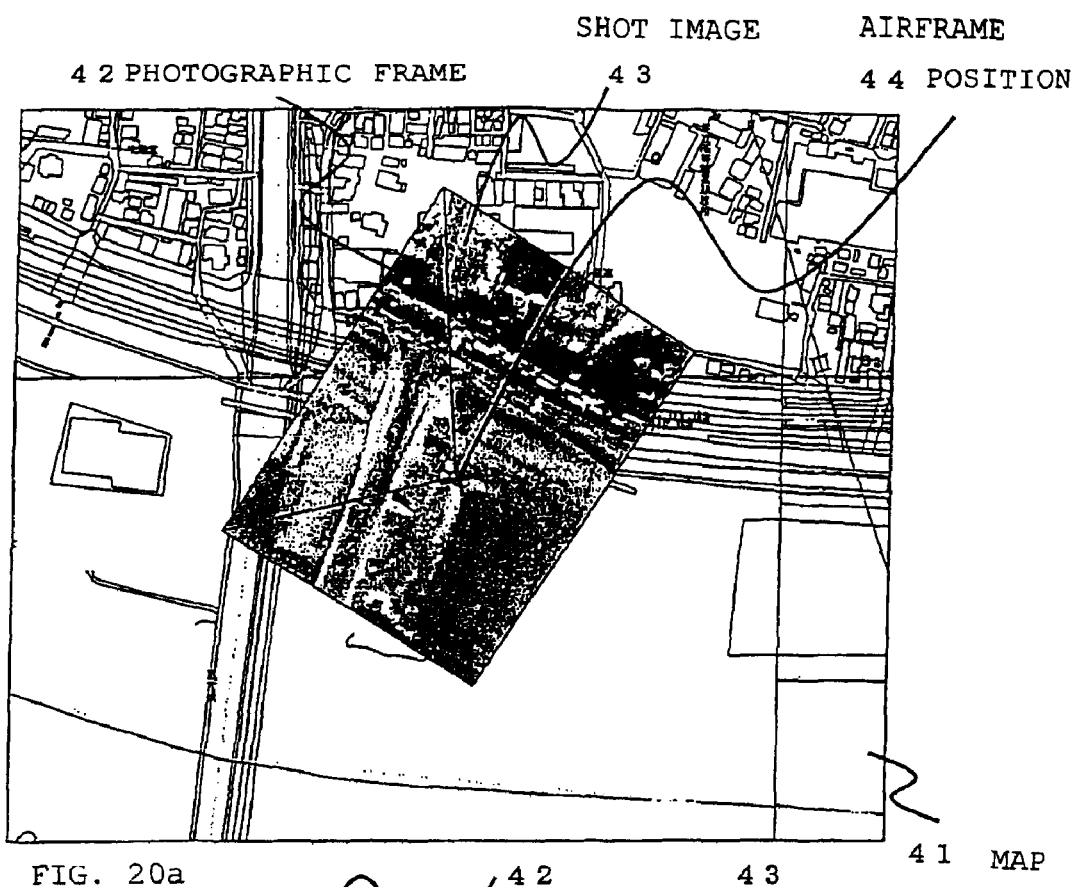
FIG. 20 are views showing effects in the image display method and the image display apparatus according to the ninth embodiment.
Figure 20B:
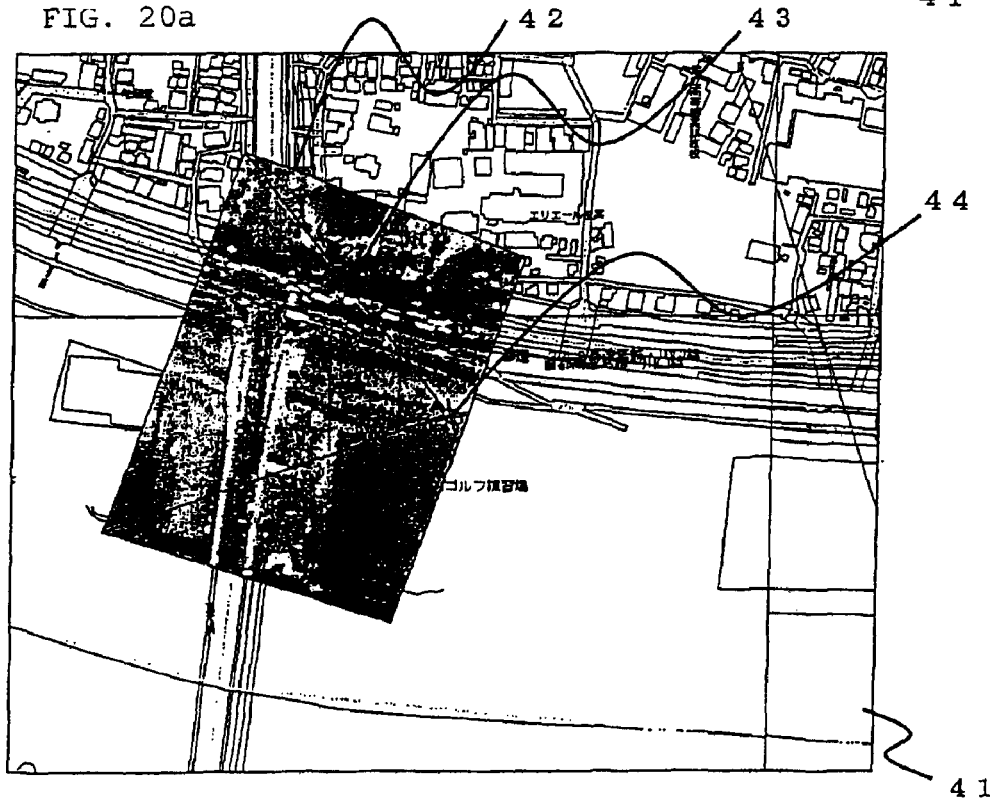

FIG. 20(a) is a picture of a photographic frame 42 and a shot image 43 being superposed onto a map 41 of the geographic information system without compensation according to the invention. FIG. 20(b) is a picture after being subjected to the compensation according to the invention, showing a photographic fame 42 and a shot image 43 being superposed on the map 41 of a geographic information system. Numeral 44 indicates an airframe position (camera position). By the processing with map processing means 226 including the above-described compensation processing, an image and a map are in coincidence at all points, as shown in FIG. 20(b), thus enabling to carry out a superposed display with high precision, and to understand situations of the ground surface having been shot more easily and rapidly.

According to this ninth embodiment, not only it is possible to correct measuring error of various measurement devices that measure each parameter; but also it becomes possible to correct error having occurred due to lag in timing between shooting and data-getting of camera posture information (pan•tilt) in the case of superposing and displaying an image having been shot during operation of a camera that is mounted on the airframe on the map.

Embodiment 10

This tenth embodiment is a method of making the parameter adjustment of the above-mentioned ninth embodiment not by the compensation of pan and tilt but by the compensation of posture information (roll and pitch) of the airframe, thereby compensating position of a photographic frame. The compensation of roll and pitch is executed with the following computation.

When letting landmark coordinates on an image at the time of completing the rotational processing with a tilt and pan ($x_1$, $y_1$, $z_1$), landmark coordinates ($x_2$, $y_2$, $z_2$) at the time of having executed the rotational processing with a roll θ and pitch φ is obtained with the following expression 22.

$$(x_2 \ y_2 \ z_2) = (x_1 \ y_1 \ z_1) \begin{pmatrix} \cos\theta & 0 & \sin\theta \\ 0 & 1 & 0 \\ -\sin\theta & 0 & \cos\theta \end{pmatrix} \begin{pmatrix} 1 & 0 & 0 \\ 0 & \cos\phi & \sin\phi \\ 0 & -\sin\phi & \cos\phi \end{pmatrix}$$ [Expression 22]

Further, when performing the projection onto the ground surface, landmark coordinates (x, y, z) are obtained with the following expression 23.

$$(x \ y \ z) = (x_2 \ y_2 \ z_2) \cdot \frac{h}{z_2}$$ [Expression 23]

Herein, an alphabet h is an airframe altitude, and θ, φ satisfying the following expression 24.

$$\begin{cases} x(\theta, \phi) = x_0 \\ y(\theta, \phi) = y_0 \end{cases}$$ [Expression 24]

when letting landmark coordinates on the map ($x_0$, $y_0$), are roll $\theta_0$, pitch $\phi_0$ after the compensation.

According to this tenth embodiment, since the camera is fixedly attached to the airframe, and mounted so that an angle of pan and tilt is not varied, the compensation of parameters in the more real state can be made by correcting posture information of the airframe that is a roll and pitch even in the case where the compensation with a pan an tilt is in effective, thus enabling to carry out a more precisely superposed display. As a result, it is possible to understand situations of the ground surface having been shot more easily and rapidly.

Embodiment 11

According to this eleventh embodiment, 2 points of landmarks are extracted, and the altitude compensation of the airframe is made with a distance between these 2 points. In the case where 2 points of landmarks are extracted in S23 of the ninth embodiment (FIG. 16), the corresponding 2 points of landmarks are likewise extracted also from a still image data (S24) (S25).

In the case where the corresponding landmarks are extracted also from an image in S25, the landmarks having been obtained in S23 and S25 are compared, and an airframe altitude is compensated so that a distance between 2 points of landmarks on the image and a distance between 2 points of landmarks on the GIS map (in this case, since an airframe altitude is obtained as an absolute altitude from the sea level with the GPS, a relative altitude from the ground surface will be obtained by this altitude compensation) (S27) (S28).

Further, a photographic frame is computed again based on the compensation values of parameters that are obtained in S28, a still image data 208 is transformed in conformity with this photographic frame and displayed being superposed on a map of a geographic information system (S29) (S30) (S31).

Figure 21A:
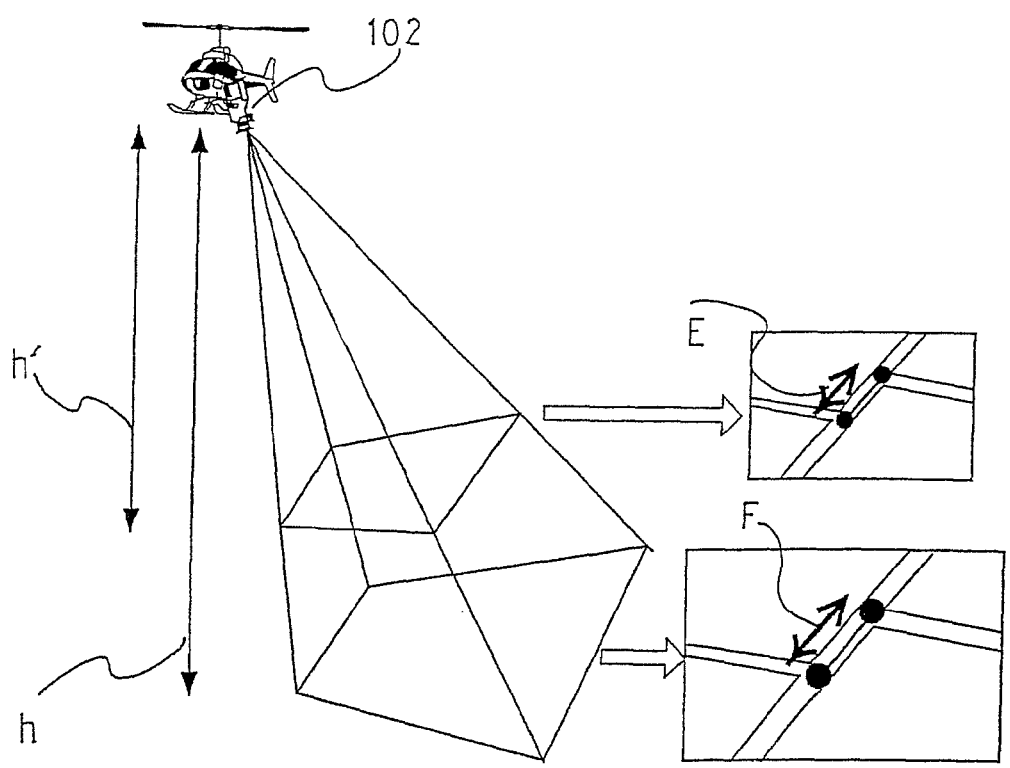
FIG. 21 are views explaining an eleventh embodiment of the invention.
Figure 21B:
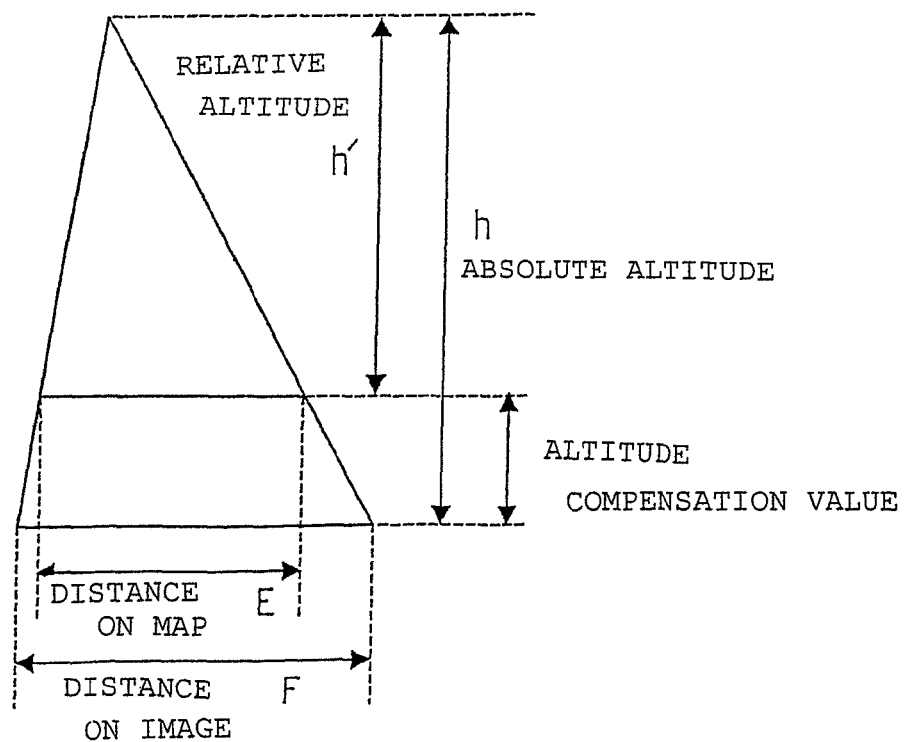
Figure 22A:
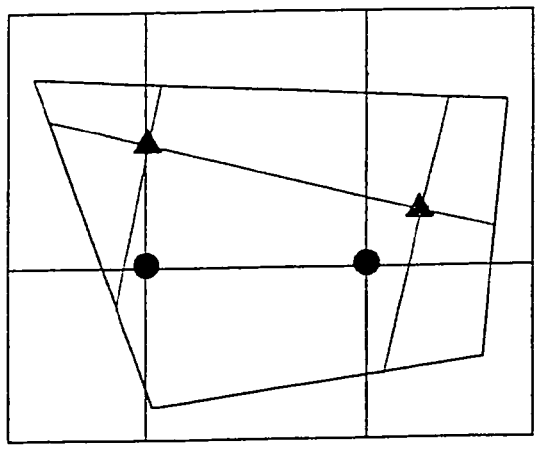
FIG. 22 are diagrams explaining a twelfth embodiment of the invention.
Figure 22B:
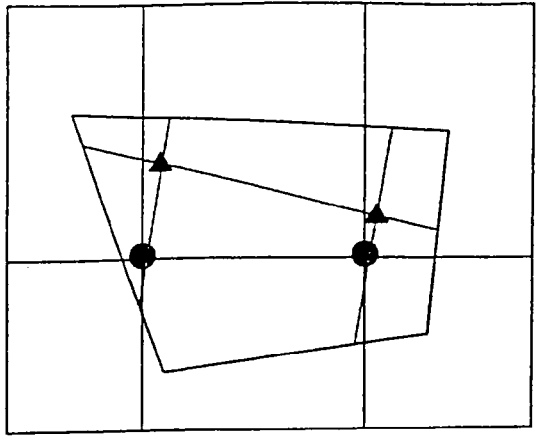
Figure 22C:
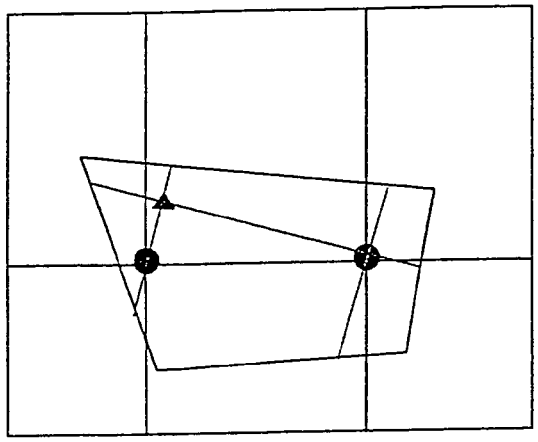
Figure 22D:
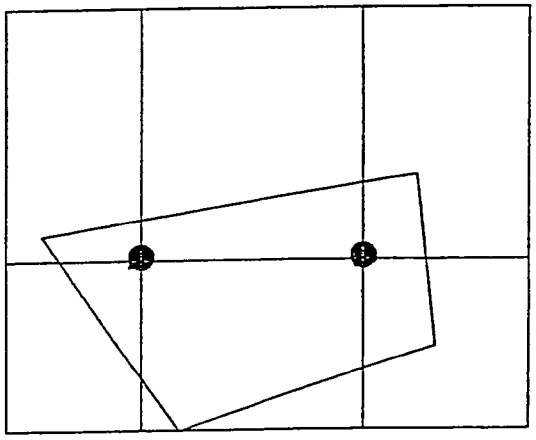

As seen from FIG. 21(b), an altitude (relative altitude) h' having been compensated with a distance between landmarks according to the invention is obtained with the expression of (relative altitude)=(absolute altitude)×(distance between 2 points of landmarks on a map)/(distance between 2 points of landmarks on an image), letting an absolute altitude of the airframe h. In the drawing, E is a distance on the map and F is a distance on the image.

By the processing with map processing means 226 including the above-described compensation processing, a shot image with respect to a point of land of which ground surface is higher than the sea level can be displayed being superposed with high precision, thereby enabling to understand situations of the ground surface having been shot more easily and rapidly.

Embodiment 12

This twelfth embodiment is intended to make it possible that a shot image and map are displayed being superposed with higher precision by compensating parameters in accordance with the number of landmarks. In the case where 2 points of landmarks are extracted in S22 of the foregoing ninth embodiment (FIG. 16), the corresponding 2 points of landmarks are likewise extracted also from a still image data 208 (S24) (S25). In the case where the landmarks are extracted also from an image in S25, the corresponding landmarks obtained in S23 and S25 are compared.

First, parameter (pan and tilt) values having been used in the image frame computing of S22 are compensated so that the first corresponding landmarks are in coincidence, and next airframe posture parameter (roll and pitch) values are compensated so that a difference between the second corresponding landmarks are corrected (S27) (S28). Further, a photographic frame is computed again based on the compensation values of each parameter obtained in S28, and a still image data 208 is transformed in conformity with this photographic frame and displayed being superposed on the map of the geographic information system (S29) (S30) (S31).

FIG. 22 is a diagram explaining this compensation, and in which black circle marks indicate landmarks on the map and filled triangle marks indicate landmarks on the image. FIG. 22(a) shows the state in which a shot image is displayed being superposed on the GIS map; FIG. 22(b) shows the state after the altitude compensation according to the foregoing eleventh embodiment has been executed; FIG. 22(c) shows the state after the pan and tilt compensation has been executed thereafter; and FIG. 22(d) shows the state after the roll and pitch compensation has been further executed.

According to this twelfth embodiment, even in the case where it is difficult that a shot image and a map are displayed being superposed with high precision over the entire photographic area by the adjustment of parameters with only 1 point of landmarks in coincidence, the superposed display with higher precision can be achieved by using 2 points of landmarks, thereby enabling to understand situations of the ground surface having been shot more easily and rapidly.

Embodiment 13

According to this thirteenth embodiment, in the case where not less than 3 points of landmarks are extracted, parameter compensation values between all the two points, and an average value thereof is used as a parameter compensation value. In the case where a plurality of landmarks of not less than 2 points are extracted in S23 of the ninth embodiment (FIG. 16), the corresponding plural landmarks of not less than 2 points are likewise extracted also from a still image data 208 (S24) (S25).

In the case where landmarks are extracted also from an image in S25, the corresponding 2 points are picked up from the landmarks having been obtained in S23 and S25, and respective comparisons are executed, thereby obtaining a compensation value of parameters. This processing is executed as to all selections of 2 points of landmarks, whereby a plurality of parameter compensation values are obtained, an average of these compensation values as to respective parameters is obtained, and these average values are used as a compensation value of respective parameters (S27) (S28). Further, a photographic frame is computed again based on the compensation value of parameters having been obtained in S28, and a still image data 208 is transformed in conformity with this photographic frame and displayed being superposed on a map of the geographic information system (S29) (S30) (S31).

By the map processing including the mentioned compensation processing, as compared with the case of compensating the superposed display of an image and map based on positions of 1 or 2 points of landmarks, it is now possible to achieve the superposed display with higher precision, thereby enabling to understand situation of the ground surface having been shot more easily and rapidly.

Embodiment 14

This fourteenth embodiment relates to superposed display processing onto the map in the case where plural pieces of images are shot continuously in cycles of a predetermined time period and a series of plural images are provided as a still image data. The extraction processing of landmarks is carried out with respect to an obtained still image. As a result, supposing that landmarks are extracted, the compensation is executed by the comparison with the GIS map. However, landmarks cannot always be extracted from all the still images. In the live display processing of performing the superposed display while taking a shot, it is difficult to instantly execute image processing to extract landmarks and perform the compensation with respect to all shot images due to processing time period.

Therefore, as for the superposed display on the map of a still image in which landmarks are not extracted, image fame computation is executed again based on compensation values at the time of the last compensation, an image is transformed in conformity with the photographic frame having been obtained and displayed being superposed on a map of the geographic information system, thereby achieving improvement in precision of the superposed position.

Figure 23:
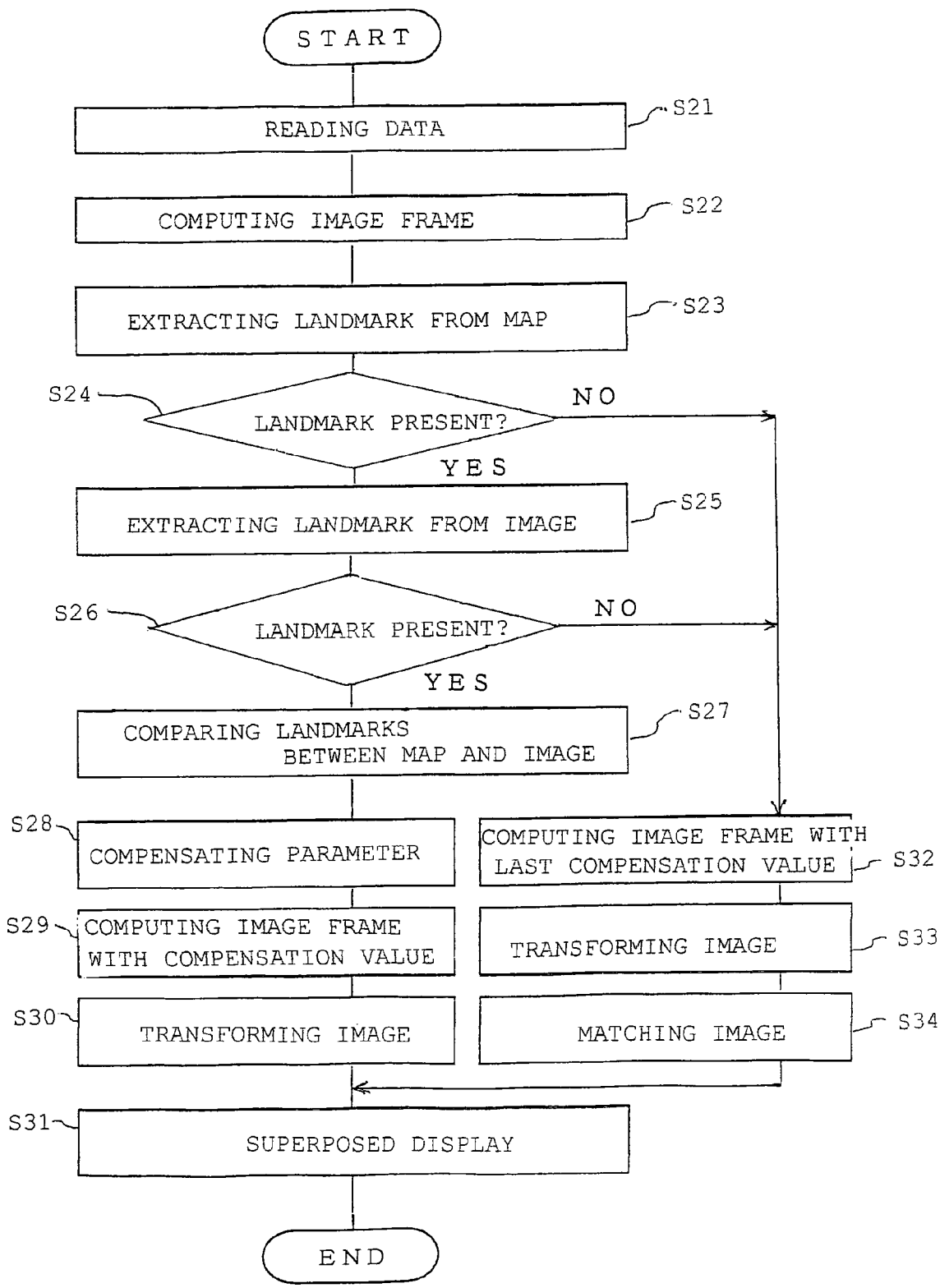
FIG. 23 is a flowchart showing operations in an image display method and an image display apparatus according to a fourteenth embodiment of the invention.
Figure 24:
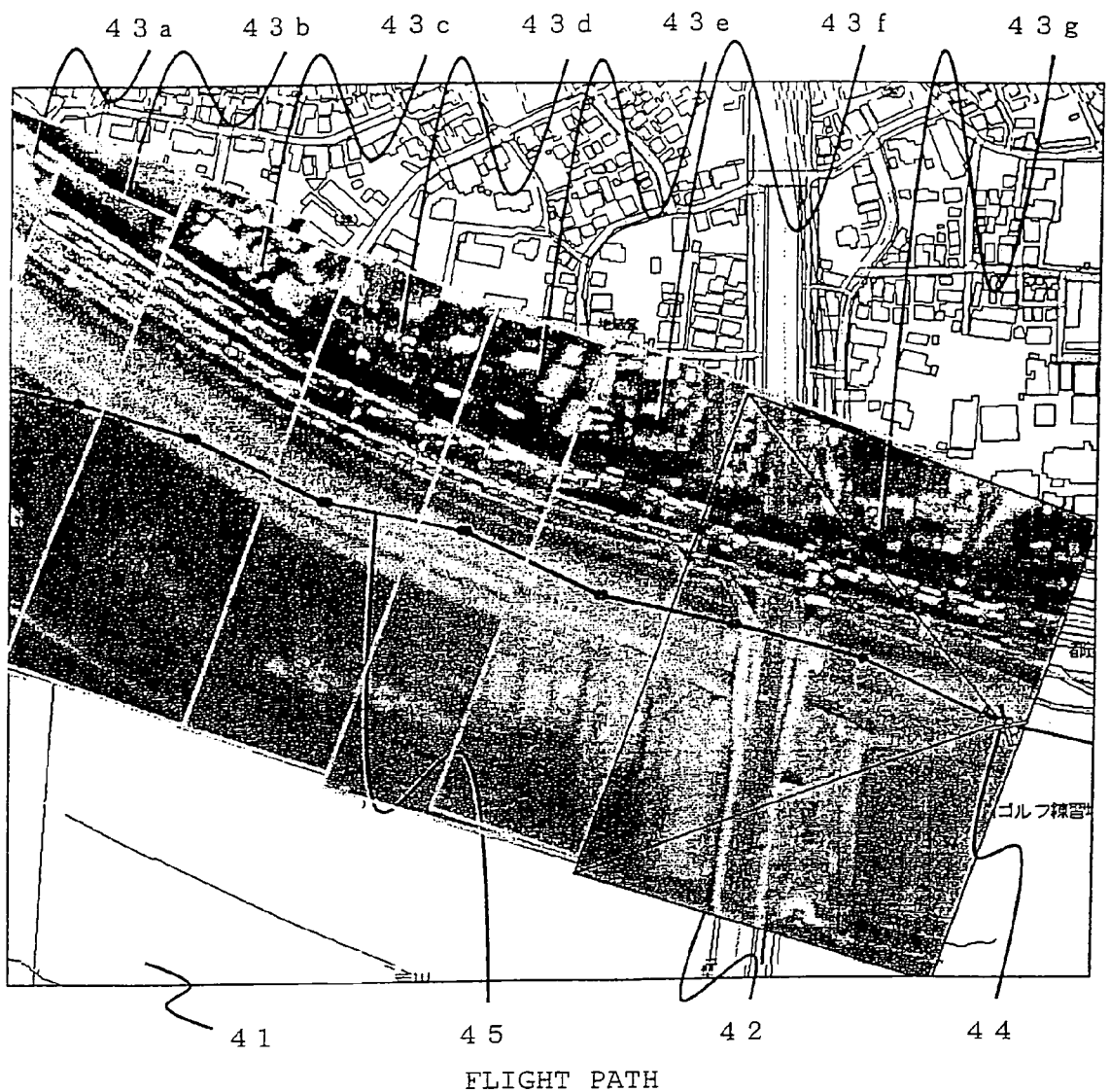
FIG. 24 is a view showing effects in the image display method and the image display apparatus according to the fourteenth embodiment.

This processing corresponds to S24, S26, S32, S33, S31 of FIG. 23. In the case where any corresponding landmark is extracted in S24, the same processing as in the ninth embodiment is executed. FIG. 24 shows a monitor display screen according to this method. Numeral 41 designates a map; numeral 44 designates an airframe position (camera position); and numeral 45 designates a flight path of the airframe. Images having been shot with the camera along the flight path 45 are sampled with a predetermined timing, subjected to the superposed positional compensation respectively, and thereafter displayed being superposed on a map 41 of the geographic information system. Numerals 43a to 43g designate pasted images. Numeral 42 designates a photographic frame of the latest image 43g.

According to this fourteenth embodiment, even in the case where no landmarks are extracted, it is possible to compensate superposed display positions, thereby enabling to carry out the superposed display with high precision, as well as enabling to understand situations of a wide range of the ground surface having been shot more easily and rapidly.

Embodiment 15

The fifteenth embodiment relates to superposed display processing onto the map in the case where plural pieces of images are shot continuously in cycles of a predetermined time period and a series of plural images are provided as a still image data. As for images having been continuously shot, there are some images that are subjected to the superposed positional compensation by the comparison of landmarks, and other images with which the superposed positional compensation by the comparison cannot be performed.

In this case, at the time of real flight, as shown in the foregoing fourteenth embodiment, the last compensation values continue to be used until the next landmark is extracted. However, in the processing of superposed display of an image on a map with the use of any image of past flight, a processing time period for positional compensation can afford to be spent as compared with the case of live flight. Accordingly, in the case where the image of past flight is displayed being superposed on the map, as shown in FIG. 25, compensation values of each parameter that are obtained at a point of land where the next landmarks are extracted are applied, going back to the halfway point between the point of having executed the compensation by landmark comparison last and the current point.

With reference to FIG. 25, a gray square indicates a landmark extraction image, and a white square shows an image from which no landmark is extracted. Further, an arrow shows that superposed positional compensation values are utilized from an image from which landmarks are extracted and with which the superposed positional compensation has been executed, and a superposed position is compensated. According to this fifteenth embodiment, an overlap state between images in the case where any compensation by comparison of landmarks cannot be executed is improved as shown in FIG. 25.

Figure 25A:
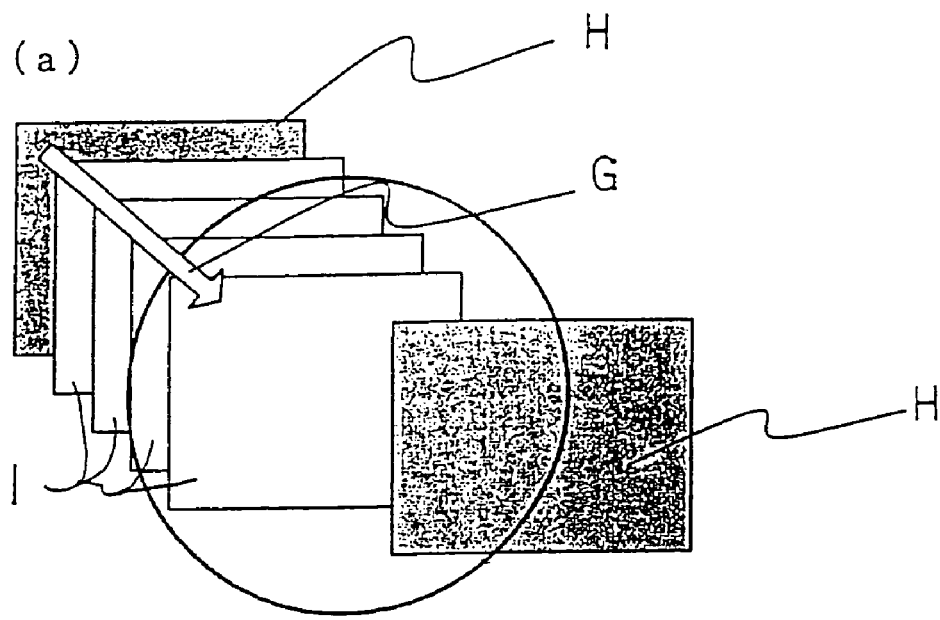
FIG. 25 are diagrams explaining a fifteenth embodiment of the invention.
Figure 25B:
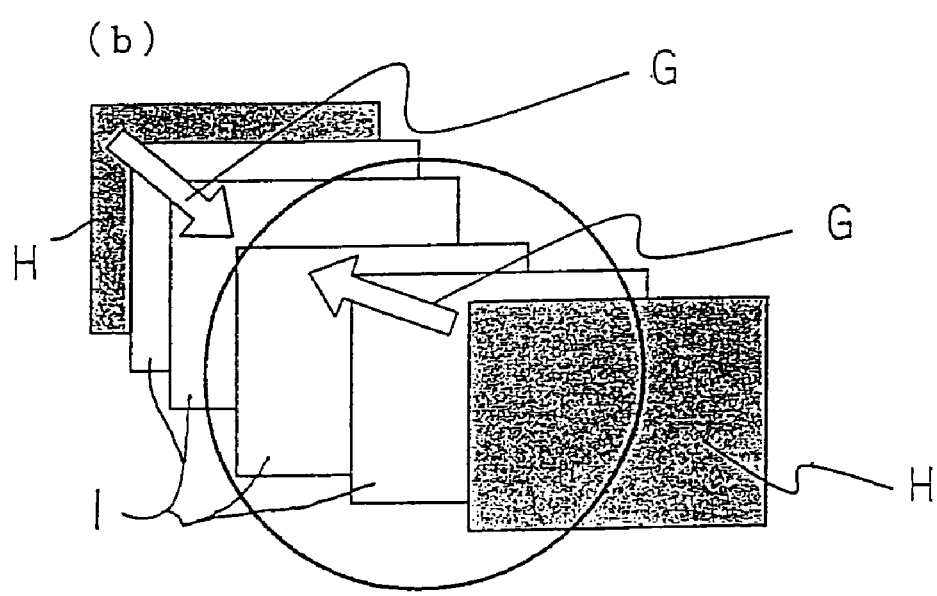

FIG. 25(a) shows the case where this fifteenth embodiment is not applied, and FIG. 25(b) shows the case where this fifteenth embodiment is applied. A shot image with which the superposed display positional compensation of image by the comparison of landmarks can be executed is taken as a base point, and the layout of images are adjusted back and forth so as to maximize the rate of coincidence of overlap parts of images toward the halfway point between the shot images with which the superposed display compensation is executed, whereby the images having been continuously shot can be displayed being superposed on the GIS map with higher precision.

According to the fifteenth embodiment, in the processing of superposing and displaying the images of past flight on the GIS map, it is possible to execute the compensation of superposed display positions even in the case where no landmark is extracted. Furthermore, the overlapping condition between the images is not segmented with the image from which a landmark is extracted, thus enabling to carry out the superposed display in more smooth succession with high precision, as well as enabling to understand situations of a wide range of the ground surface having been shot more easily and rapidly.

Embodiment 16

According to this sixteenth embodiment, an altitude compensation data of a shot image to be extracted from flight images of the past is linked to a position and registered, whereby altitude compensation of a shot point of land is executed even in the case where landmarks cannot be extracted from a shot image.

In the case where the altitude compensation processing can be executed with the coincidence of landmarks, an altitude compensation value obtained as a difference between absolute altitude and a relative altitude is registered and managed at a shot point of land as an altitude compensation value of this point, whereby, this altitude compensation value can be utilized at any time. Further, in the case where the airframe flies at a point of land close to the foregoing point and from the next flight on, the altitude compensation can be executed even at the time of live flight when a processing time period is limited, or even in the case where not less than 2 points of corresponding landmarks cannot be extracted in a still image and a map.

Figure 26:
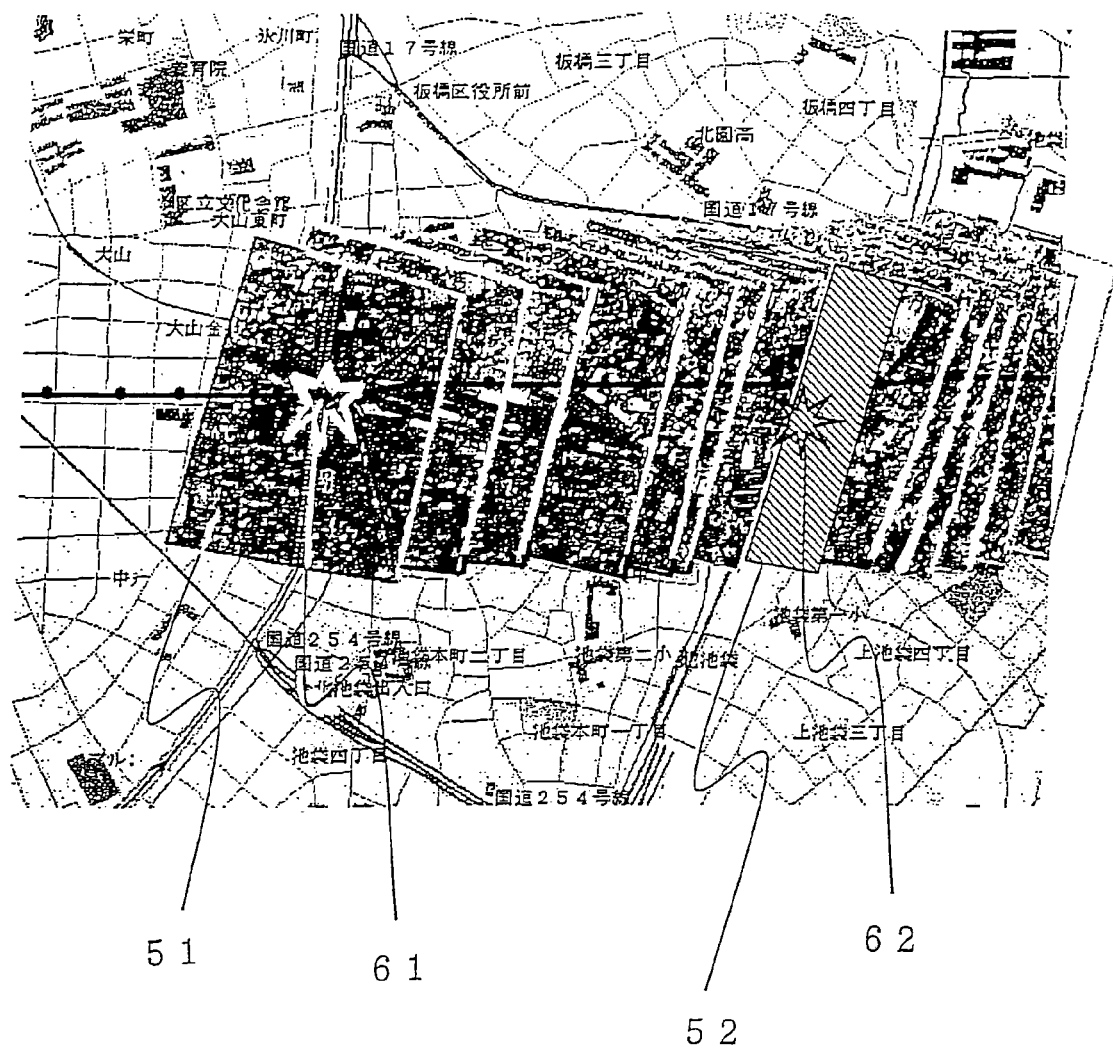
FIG. 26 is a view explaining a sixteenth embodiment of the invention.

FIG. 26 shows a state in which still images having been continuously shot are displayed being superposed on the GIS map. Explained in this drawing is the case where 2 points of landmarks are extracted from the last one piece of image 51 and the intermediate one piece of image 52, and a compensation value of altitude can be obtained.

Not less than 2 points of landmarks are in coincidence with the image 51 and the image 52, thereby enabling to obtain a compensation value of altitude. When letting these compensation values 61 and 62 respectively, the altitude compensation values 61 and 62 at points on the map are registered as symbols. With respect to an image from which not less than 2 points of landmarks cannot be extracted, an altitude compensation value at this point of land is provided, thus executing the compensation of error due to not only a mounting angle of the camera but also an altitude of the ground surface, thereby enabling to superpose and display images having been continuously shot on the GIS map with higher precision.

According to the sixteenth embodiment, by registration of an altitude compensation data having been extracted from the images of past flight at a point on the map, it is possible to carry out the altitude compensation with respect to an image from which not less than 2 points of landmarks cannot be extracted, thereby enabling the superposed display with higher precision.

INDUSTRIAL APPLICABILITY

The present invention is applicable to an image display taking a shot of situations on the ground from on board such as helicopter in the case where natural disaster such as earthquake or fire occurs or where human disaster such as explosion or serious accident occur.

The invention claimed is:

1. An image display apparatus of image processing and displaying a shot image of the ground surface having been taken with photographic equipment that is mounted on an airframe in the air, the image display apparatus comprising:

an image frame computing means in which a shooting position in the air is specified three-dimensionally based on posture of said airframe and said photographic equipment with respect to said ground surface and a photographic area on the ground surface having been shot is obtained by computation;

an image transformation means in which a shot image is transformed in conformity with said photographic area;

a superposing means in which said transformed image is superposed on a map of a geographic information system; and a monitor display means for displaying said superposed map, wherein landmarks are extracted from said map of said geographic information system and said shot image respectively, and the corresponding landmarks are compared, whereby a parameter for use in computing a photographic area of the ground surface having been shot is compensated, and a shot image is displayed being superposed with high precision on said map of the geographic information system.

2. The image display apparatus according to claim 1, wherein said image frame computing means obtains a photographic area on the ground surface having been shot by computation based on an inclination and a rotation angle of said photographic equipment with respect to said airframe.

3. The image display apparatus according to claim 1, wherein said image frame computing means obtains a photographic area on the ground surface having been shot by computation based on an inclination and a roll angle of said airframe with respect to the ground surface.

4. The image display apparatus according to claim 1, wherein said image frame computing means obtains a photographic area on the ground surface having been shot by computation based on an inclination and rotation angle of said photographic equipment with respect to said airframe, and an inclination and roll angle of said airframe with respect to the ground surface.

5. The image display apparatus according to claim 4, wherein said image frame computing means obtains a photographic area on the ground surface by computation, thereafter obtains an altitude of the ground surface of said photographic area by utilizing a three-dimensional topographic data including altitude information as to undulation of the ground surface which data has been preliminarily prepared, computes an altitude of shooting point as a relative altitude obtained by subtracting an altitude of the ground surface from an absolute altitude of the airframe;

the image transformation means transforms a shot image in conformity with said photographic area; and the superposing means displays the transformed image so as to be superposed on a map of the geographic information system.

6. An image display apparatus of image processing and displaying a shot image of the ground surface having been taken with photographic equipment that is mounted on an airframe in the air, the image display apparatus comprising:

an image frame computing means in which a shooting position in the air is specified three-dimensionally based on posture of said airframe and said photographic equipment with respect to said ground surface, and each of a plurality of photographic areas on the ground surface having been continuously shot is obtained by computation;

an image transformation means in which each shot image is transformed in conformity with each of said plurality of photographic areas;

a superposing means in which said plurality of transformed shot images are superposed on a map of a geographic information system; and a monitor display means for displaying said superposed map, wherein landmarks are extracted from said map of said geographic information system and said shot image respectively, and the corresponding landmarks are compared, whereby a parameter for use in computing a photographic area of the ground surface having been shot is compensated, and a shot image is displayed being superposed with high precision on said map of the geographic information system.

7. The image display apparatus according to claim 6, further comprising an image joining and compensating means in which a plurality of shot images to be superposed are partially overlapped with each other, and the shot images are moved and compensated so that an overlapping at the overlap part may be of the largest extent and thereafter are joined.

8. The image display apparatus according to claim 6, wherein said plurality of shot images to be superposed are obtained by sampling the images having been continuously shot in cycles of a predetermined time period.

9. An image display apparatus for taking a shot of the ground surface with photographic equipment that is mounted on an airframe in the air, and to identify situations existing on said ground surface by comparison between a shot image and a map;

wherein a shooting position in the air is specified three-dimensionally based on posture of said airframe and said photographic equipment with respect to said ground surface, and signals of said airframe positional information, camera information, and airframe information are transmitted in synchronization with signals of an image having been shot;

a photographic area on the ground surface having been shot is obtained by computation on the receiving side, and a shot image is transformed in conformity with said photographic area and thereafter displayed being superposed on a map of a geographic information system, and wherein landmarks are extracted from said map of said geographic information system and said shot image respectively, and the corresponding landmarks are compared, whereby a parameter for use in computing a photographic area of the ground surface having been shot is compensated, and a shot image is displayed being superposed with high precision on said map of the geographic information system.

10. An image display method of image processing and displaying a shot image of the ground surface having been taken with photographic equipment that is mounted on an airframe in the air, wherein a shooting position in the air is specified three-dimensionally based on posture of said airframe and said photographic equipment with respect to said ground surface and, a photographic area of at least one image of the ground surface having been shot is obtained by computation;

a shot image is transformed in conformity with said photographic area;

thereafter the transformed shot image is displayed being superposed on a map of a geographic information system, and the shot image having been superposed on the map can be erased leaving only a photographic area frame, wherein landmarks are extracted from said map of said geographic information system and said shot image respectively, and the corresponding landmarks are compared, whereby a parameter for use in computing a photographic area of the ground surface having been shot is compensated, and a shot image is displayed being superposed with high precision on said map of the geographic information system.

11. The image display method according to claim 10, wherein a parameter to be compensated is changed in accordance with the number of landmarks having been extracted.

12. The image display method according to claim 10, wherein an inclination and a rotation angle of said photographic equipment with respect to said airframe are compensated based on the landmark having been extracted, and a photographic area on the ground surface having been shot is computed.

13. The image display method according to claim 10, wherein an inclination and a roll angle of said airframe with respect to the ground surface are compensated based on the landmark having been extracted, and a photographic area on the ground surface having been shot is computed.

14. The image display method according to claim 10, wherein 2 points of landmarks having been extracted are used, an altitude of said airframe is compensated based on a distance between two points, and a photographic area of the ground surface having been shot is computed.

15. The image display method according to claim 14, wherein an altitude compensation value is registered at a point of land where altitude compensation processing of a shot image is executed due to coincidence of the landmarks, and said registered altitude compensation value can be utilized again as a reference value of altitude compensation in the case of flying at a point of land close to said point from the next time on.

16. The image display method according to claim 10, wherein an average value of parameter compensation values between 2 points of each landmark is used in the case of not less than 3 landmarks having been extracted, and a photographic area of the ground surface having been shot is computed.

17. The image display method according to claim 10, wherein in the case of absence of the corresponding landmarks at the time of extracting landmarks from a map of said geographic information system and each of said plural pieces of shot images respectively, a parameter for use in computing a photographic area on the ground surface having been shot is compensated based on a compensation value at the time of having extracted a landmark last, and shot images to be joined partially overlapped with each other and displayed being superposed on the map are moved such that an overlapped state at said overlap part is of the largest extent, and thereafter are joined.

18. The image display method according to claim 10, wherein landmarks are extracted from a map of the geographic information system and each shot image respectively, a parameter for use in computing each photographic area of the ground surface having been continuously shot is compensated based on a current compensation value, getting back to a halfway point between the shot image of when a landmark has been extracted last time and the current shot image, and said plural pieces of shot images are displayed being superposed with high precision on a map of the geographic information system.

* * * * *